(12) United States Patent
Yamasaki

(10) Patent No.: US 7,199,934 B2
(45) Date of Patent: Apr. 3, 2007

(54) HEAD-MOUNTED DISPLAY APPARATUS

(75) Inventor: Masafumi Yamasaki, Hachioji (JP)

(73) Assignee: Olympus Corporation (JP)

( * ) Notice: Subject to any disclaimer, the term of this patent is extended or adjusted under 35 U.S.C. 154(b) by 2 days.

(21) Appl. No.: 11/122,502

(22) Filed: May 5, 2005

(65) Prior Publication Data

US 2005/0248852 A1 Nov. 10, 2005

(30) Foreign Application Priority Data

May 6, 2004 (JP) ............................. 2004-137768
Jun. 11, 2004 (JP) ............................. 2004-174564

(51) Int. Cl.
*G02B 27/14* (2006.01)
*G09G 5/00* (2006.01)

(52) U.S. Cl. ......................................... 359/630; 345/7
(58) Field of Classification Search ........ 359/630–634; 345/7, 8, 9; 349/11; 348/115
See application file for complete search history.

(56) References Cited

U.S. PATENT DOCUMENTS 6,034,653 A * 3/2000 Robertson et al. ............. 345/8
6,177,966 B1 * 1/2001 Masuda et al. ............... 349/8
6,567,220 B2 * 5/2003 McDonald et al. ........ 359/630

FOREIGN PATENT DOCUMENTS

JP 06-078247 3/1994
JP 2003-248194 9/2003

OTHER PUBLICATIONS

"Psychological Physics of Visual Sense"; Mitsuo Ikeda; Newest Applied Physics Series 3; Morikita Shuppan; 1975; p. 194.

* cited by examiner

*Primary Examiner*—Ricky Mack
*Assistant Examiner*—M. Hasan
(74) *Attorney, Agent, or Firm*—Ostrolenk, Faber, Gerb & Soffen, LLP

(57) ABSTRACT

A head-mounted display apparatus comprises a see-through image display portion for setting a display frame in a display-capable range, and displaying an image in such a manner that the image is superimposed on an image of the external environment in the display frame, an angular velocity sensor for detecting the tilting angle of the head of an observer; an LCD driver, a second CPU and the like which control the display frame to move in an amount corresponding to the angle detected by the angle detection means in the direction opposite to the tilting direction of the observer's head, whereby the position of a virtual image, observed by the observer, is kept substantially constant, irrespective of the tilting of the observer's head, and first CPU which controls the apparatus so that the mode of the apparatus is automatically changed to a low consumption power mode.

12 Claims, 21 Drawing Sheets

HEAD-MOUNTED DISPLAY APPARATUS

This application claims benefit of Japanese Application No. 2004-137768 filed in Japan on May 6, 2004, Japanese Application No. 2004-174564 filed in Japan on Jun. 11, 2004, the contents of which are incorporated by this reference.

BACKGROUND OF THE INVENTION

1. Field of the Invention

The present invention relates to a head-mounted display apparatus, and more particularly, to a head-mounted display apparatus which displays images in a manner such that they can be observed while wearing the apparatus on one's head.

2. Description of the Related Art

Hitherto, display apparatuses which are mounted to heads and by which images are observed, such as HMD (Head-Mounted Display) and HUD (Head-Up Display) have been known.

This type of display apparatuses are described, for example, in Japanese Unexamined Patent Application Publication No. 2003-248194. In the image display apparatus described in the Publication, an image disposed on a spectacle frame is projected to a hologram optical element as a combiner. The image reflected by the hologram optical element is guided to an observer's eye, so that this image as a virtual image is superimposed on the view of the external environment.

On the other hand, Japanese Unexamined Patent Application Publication No. 6-78247 describes a head-mounted display apparatus with which the operation of changing over an electronic image to an external environment image can be easily performed. Also, the Publication describes a technique by which a virtual screen can be observed as if it were stationary at a predetermined position of the external environment, although the tilting angle of an observer's head changes, and moreover, an image of the external environment can be observed on the outside of the virtual screen (see Step Nos. 0035 to 0044, particularly, Paragraph No. 0041 in the Publication).

As regards human eyes, optic cells especially having a high visual acuity, which are called pyramids, are distributed on the center of a retina at a high density, and the distribution-density of the optic cells remarkably decreases toward the periphery of the retina. There are three types of pyramids, of which the spectral sensitivity characteristic peaks exist in the R, G, and B. Thus, the sense of color is effective in the range having a radius of 20° to 30° around the center of the retina. The range having a radius from the center of up to 3° in which the pyramids are distributed at a very high density is called a center orbit. High-sensitive cells, called rods, which are reactive with brightness and are effective mainly in seeing in dim light, are distributed more and more in the direction of from the center toward the periphery, instead of the pyramids. The density of the rods is the highest in the position from the retina-center of about 20°, and is gradually reduced toward the periphery. The visual acuity of a human eye having the above-described structure is varied with brightness. It is known that when the brightness is high, the visual acuity is highest in the center orbit, and remarkably decreases near the periphery. FIG. 34 illustrates the visual acuity at the respective positions on the retina plotting the brightness as a parameter (Ikeda Mitsuo: "Newest Applied Physics (Saishin Oyo-Buturigaku) Series 3", Psychological Physics of Visual Sense (Shikaku no Shinri-Butsurigaku), p. 194, 1975, published by Morikita Shuppan). As seen in FIG. 34, when the brightness is relatively high, the pyramids distributed at a high density near the center orbit effectively act. Thus, the visual acuity is very high especially in the center of the retina. However, when the brightness is low, the pyramids do not effectively act, so that the difference between the visual acuities in the center and in the periphery is not significant. Then, it is generally known that the two-point discrimination resolving-power of the center orbit is about 1'.

In recent years, from the standpoint of the global environment protection, the saving of consumption energy has been attempted in various types of devices and apparatuses. Specifically, for example, there is known a technique in the personal computer field, by which PCs are automatically set in a low consumption power mode, when no input-operation is carried out through a keyboard, a mouse, or the like for a predetermined time-period.

According to the known HMD and HUD, even if the head is moved to a small degree, the observed virtual view is moved together with the head. Thus, the screen is observed as if it went around the head. Particular, when the observer wears the device for a long time, the screen becomes a factor in stress to the observer.

Moreover, the above-described known display apparatuses have a small size and a light weight, and are satisfactorily portable. Thus, the observer tends to move in an ordinary manner while wearing the apparatus. However, if the display screen continues to be displayed in the field of sight of the observer, the screen may disturb the ordinary movement. In order to eliminate such disturbance, it is necessary to remove the display apparatus or switch off the power supply of the apparatus before the ordinary movement is made. However, in the case of the spectacle as an example, it is troublesome to take off the spectacle prior to each movement. Similarly, it is troublesome to remove the display apparatus or switch off the power supply of the apparatus every time the ordinary movement is made.

In the known display apparatuses, similarly, it is necessary to switch off the power supply for example, for the purpose of reducing the consumption power. However, it is troublesome to frequently switch off the power supply. It is unsuitable to apply the above-described technique for reducing the consumption power used in personal computers, that is, the technique by which the power supply is controlled in the case in which input-operation is not executed for a predetermined time-period, to information display apparatuses for which intentional input-operation is not necessarily carried out. For display apparatuses which use batteries or the like as power supply and are portable, it is very important to reduce the supply power.

SUMMARY OF THE INVENTION

Accordingly, it is an object of the present invention to provide a head-mounted display apparatus in which the observation of an image and that of the external environment can be simply changed over, and also the power consumption can be effectively reduced.

Briefly, the head-mounted display apparatus of the present invention comprises: an angle detector to detect (sometimes referred to interchangeably herein as "detection means") the tilting angle of the head of an observer; a display portion to display (sometimes referred to interchangeably herein as "display means") a predetermined image in such a manner that the image is superimposed on an image of the external environment, the display portion for switching a display-state in which the image is displayed and a non-display-state in which the image is not display, corresponding to the tilting angle of the observer's head detected by the angle detector; and a controller (sometimes referred to interchangeably herein as "control means") for controlling the display portion whereby, in the case in which the non-display state of the display portion continues for not less than a predetermined time-period, the non-display state is continuously kept, even when the tilting angle of the head gets to have a value corresponding to the display-state.

The above and other objects, features, and advantages of the invention will become more clearly understood from the following description referring to the accompanying drawings.

DETAILED DESCRIPTION OF THE PREFERRED EMBODIMENTS

Hereinafter, an embodiment of the present invention is described with reference to the drawings.

First Embodiment

Figure 1:
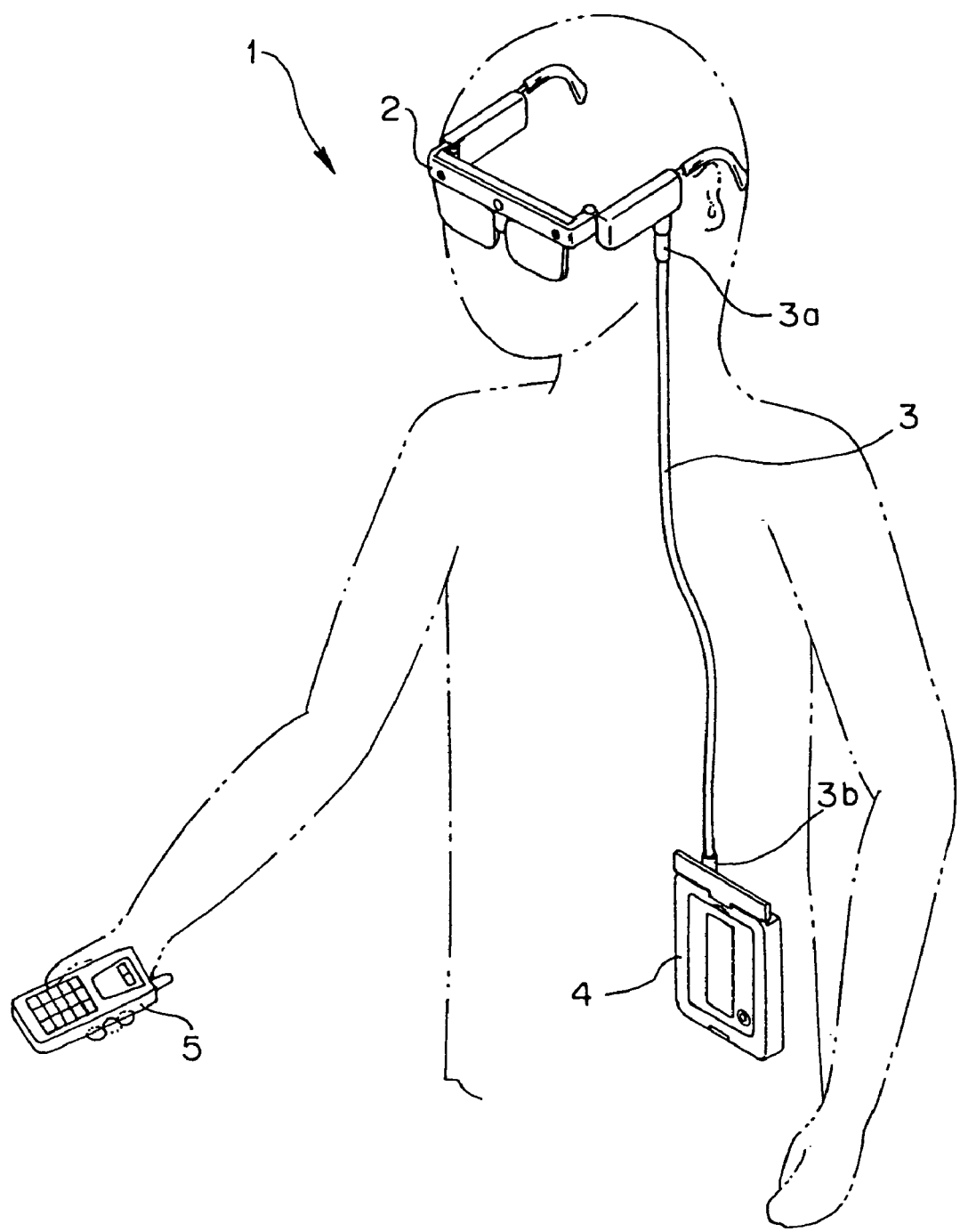
FIG. 1 is a perspective view illustrating a state in which a head-mounted information display apparatus in accordance with an embodiment of the present invention is used.

FIGS. 1 to 33 illustrate an embodiment of the present invention. FIG. 1 is a perspective view illustrating a state in which a head-mounted information display apparatus is used.

The head-mounted information display apparatus of this embodiment is an information display apparatus of a head-mounted type (a head-mounted information display apparatus), as described below.

The information display apparatus 1 includes, as shown in FIG. 1, a head-mounted unit 2 formed substantially in the shape of a pair of spectacles, a controller/recorder 4, which serves as the main body of the information display apparatus 1, connected to the head-mounted unit 2 via connecting means, such as a cable 3, and a remote controller 5 for remotely performing input operations for the information display apparatus 1.

The head-mounted unit 2 allows a user to observe a subject (in the external environment) substantially directly in a see-through display mode and also to observe a piece of information in superimposition on the subject. The head-mounted unit 2 can be worn on the head in a manner similar to ordinary eyesight-correcting spectacles, as is seen from the shape of the head-mounted unit 2. The head-mounted unit 2 is light and small so that the weight and the size thereof can be as close as possible to those of actual spectacles.

A connecting terminal 3a provided at one end of the cable 3 is connected to a cable connecting terminal 21 (see FIG. 2) of the head-mounted unit 2, and a connecting terminal 3b provided at the other end of the cable 3 is connected to a cable connecting terminal 49 (see FIG. 6) of the controller/recorder 4, thereby connecting the head-mounted unit 2 with the controller/recorder 4. As means for electrically connecting the head-mounted unit 2 with the controller/recorder 4, although wired means such as the cable 3 is used, wireless means for wirelessly connecting the two elements may be used.

The controller/recorder 4 controls the entire information display apparatus 1, and also can regenerate a piece of information to be observed by means of the head-mounted unit 2. The controller/recorder 4 is also formed to be as light and small as possible so that it can be used under various conditions. For example, it can be attached to a belt at the user's waist or it can be stored in an inner pocket of a jacket. The controller/recorder 4 can also be stored in a bag by using a long cable 3.

The remote controller 5 allows an observer to remotely control with an observer's hand, operations that are comparatively frequently performed on the information display apparatus 1. Accordingly, the remote controller 5 is formed to be light and small so that it can be held in the palm of the hand, and wirelessly communicates with the controller/recorder 4.

In this embodiment, the head-mounted unit 2, the controller/recorder 4, and the remote controller 5 are separately provided from each other. This makes the user comfortable when wearing the head-mounted unit 2, which is formed light and small, and also allows the user to easily operate this information display apparatus 1 by using the remote controller 5.

Figure 2:
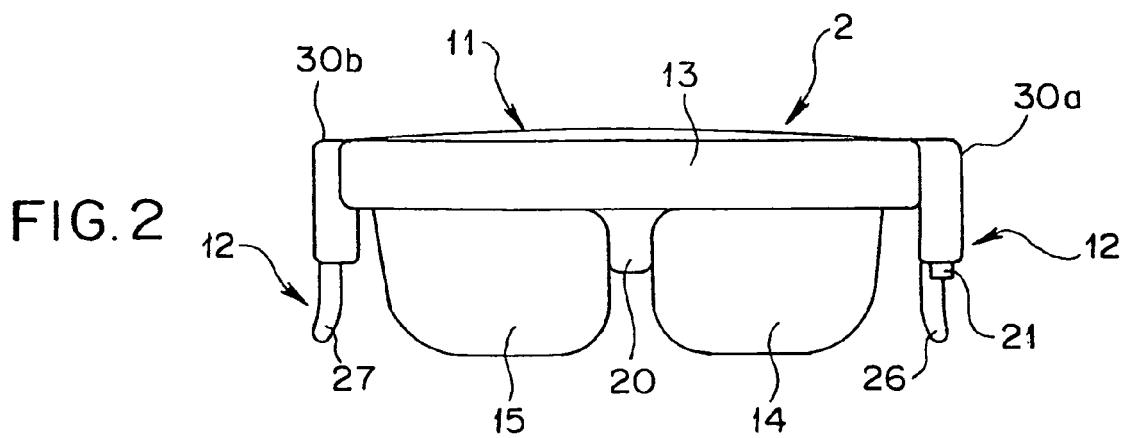
FIG. 2 is a front view illustrating the head-mounted portion thereof in the same embodiment.
Figure 3:
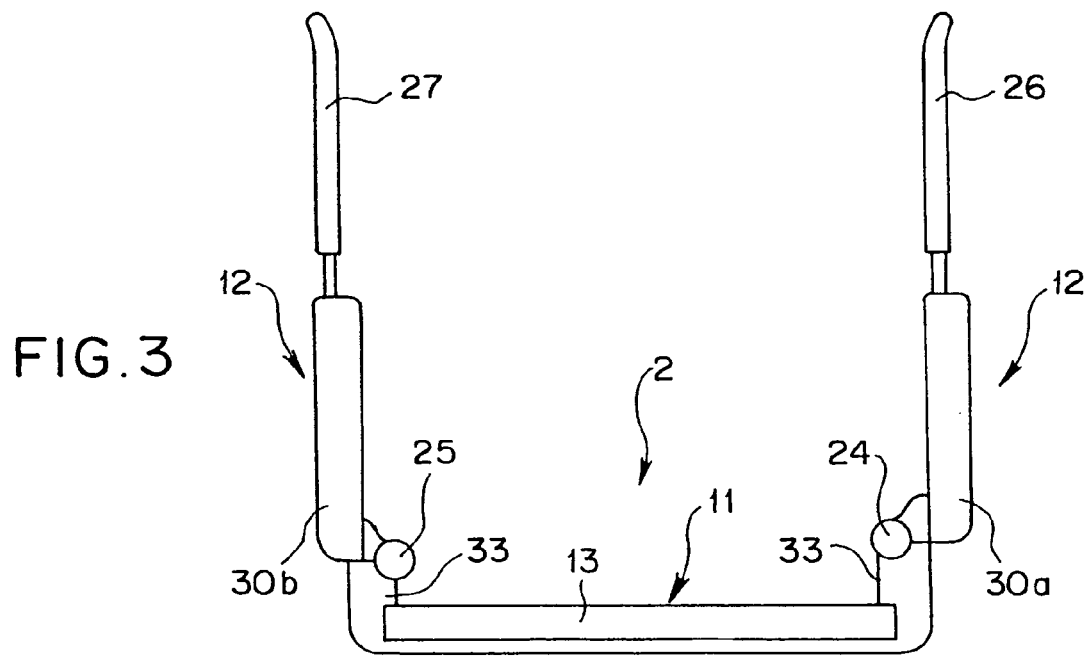
FIG. 3 is a plan view illustrating the head-mounted portion thereof in the same embodiment.
Figure 4:
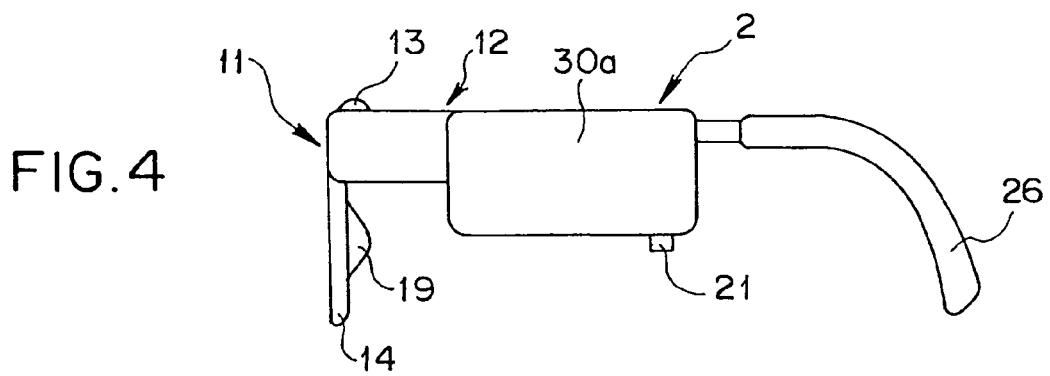
FIG. 4 is a right side view illustrating the head-mounted portion thereof in the same embodiment.

The external appearance and the overview of the head-mounted unit 2 are described below with reference to FIGS. 2 through 4. FIGS. 2, 3, and 4 are a front view, a plan view, and a right side view, respectively, illustrating the head-mounted unit 2.

The head-mounted unit 2 includes a front portion 11 corresponding to lens, rims, a bridge, and joint portions of regular spectacles and temples 12 extended from the left and right sides of the front portion 11 in the backward direction (opposite to the subject) and foldable with respect to the front portion 11.

The front portion 11 includes a frame 13, and transparent optical members 14 and 15 which serve as optical waveguide members and attached to the frame 13 in association with the right and left eyes.

The frame 13 is provided substantially at the center with a nose pad 19 for placing the head-mounted unit 2 on a nose-ridge, and a bridge 20 across the upper portion of the space between the transparent optical members 14 and 15.

The temples 12 are connected to the front portion 11 via hinges 24 and 25 so that they are foldable with respect to the front portion 11. That is, the temples 12 can be folded toward the central portion of the front portion 11 i.e., they can be folded along the front portion 11 to become small, thereby making the head-mounted unit 2 easy to store and carry. End covers 26 and 27 for placing the head-mounted unit 2 on the ears are provided at the distal ends of the left and right temples 12.

Electric equipment 30a is integrally formed on the temple 12 on the left-eye side (that is, on the right side in FIGS. 2 and 3). Also, electric equipment 30b is integrally formed on the temple 12 on the right-eye side (that is, on the left side in FIGS. 2 and 3). These electric equipments 30a and 30b accommodates electric circuits for mainly controlling the see-through display. Therefore, when the temples 12 are folded, the electric equipments 30a and 30b are also folded with the temples 12. As described above, the information display apparatus 1 can be compactly accommodated, since the electric equipments 30a and 30b are disposed on the foldable temples 12.

A cable connecting terminal 21 to be connected to the connecting terminal 3a disposed on the one end of the cable 3 is provided in the lower end on the rear side (on the side which is near the ear of the observer) of the electric equipment 30a. The electric circuit of a see-through image-display unit 6 (see FIG. 11), which will be described below, is dispersedly arranged within the inside of the front portion 11 and in the electric equipments 30a and 30b, so that the entire head-mounted unit 2 can be well balanced in size and weight, and hence, an observer wearing the head-mounted unit 2 feels comfortable.

The space between the right side of the front portion 11 and the hinge 24 and the space between the left side of the front portion 11 and the hinge 25 are formed into boxes, having a structure shown in FIGS. 19 and 20 described below, for accommodating flexible printed circuit boards or the like connecting the respective circuits on the inside of the front portion 11, and the respective circuits in the electric equipments 30a and 30b to each other.

Figure 5:
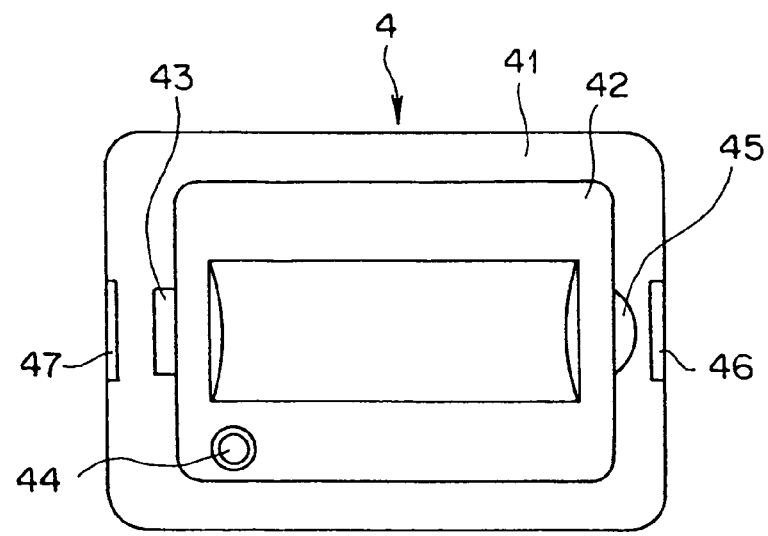
FIG. 5 is a plan view illustrating a controller/recorder when an operation panel is closed in the same embodiment.
Figure 6:
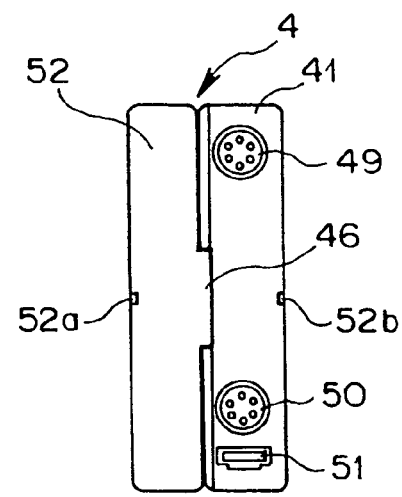
FIG. 6 is a right side view illustrating the controller/recorder when the operation panel is closed in the same embodiment.
Figure 7:
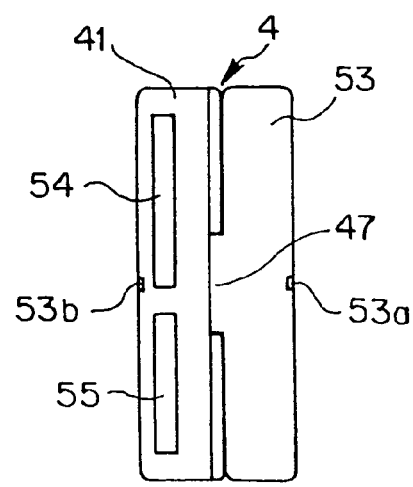
FIG. 7 is a left side view illustrating the controller/recorder when the operation panel is closed in the same embodiment.
Figure 8:
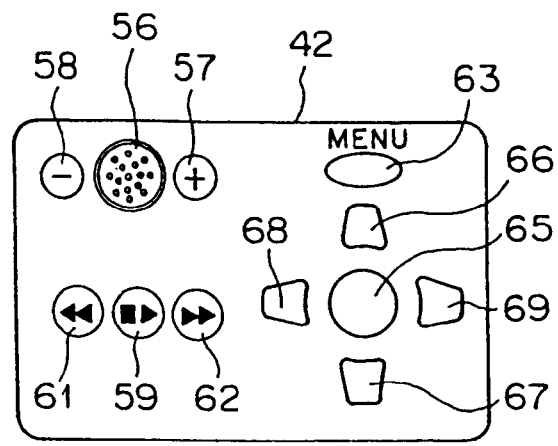
FIG. 8 is a plan view illustrating operation switches disposed on the operation panel in the same embodiment.
Figure 9:
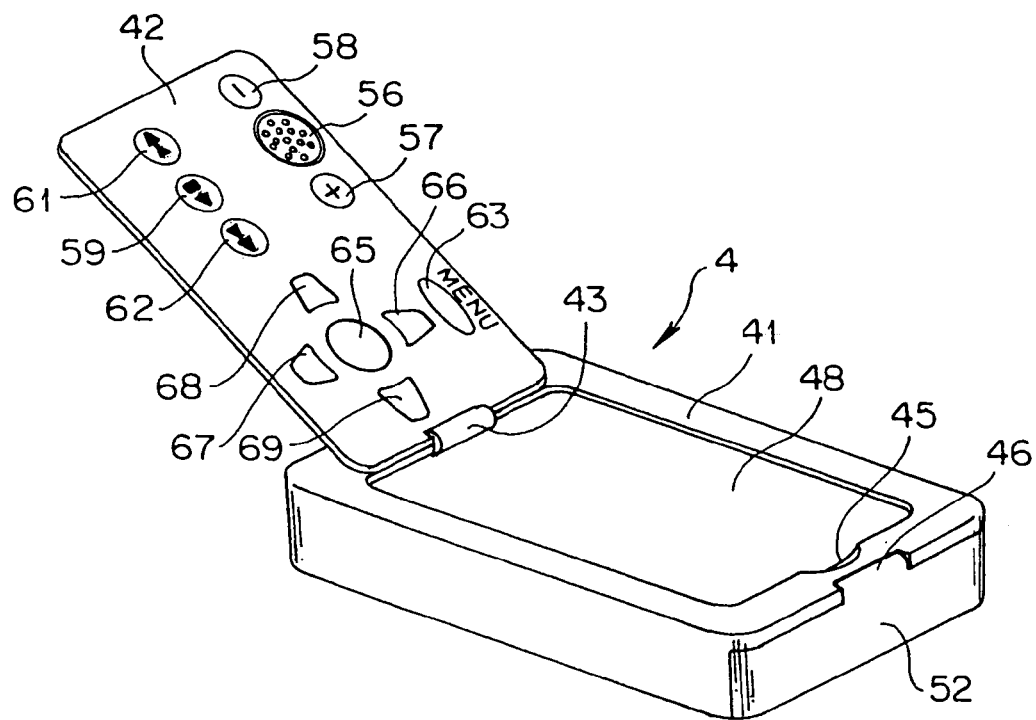
FIG. 9 is a perspective view illustrating the controller/recorder when the operation panel is opened in the same embodiment.

The external appearance and the overview of the controller/recorder 4 are described below with reference to FIGS. 5 through 9. FIGS. 5, 6, and 7 are a plan view, a right side view, and a left side view, respectively, illustrating the controller/recorder 4 when an operation panel 42 is closed. FIG. 8 is a plan view illustrating operation switches disposed on the operation panel 42. FIG. 9 is a perspective view illustrating the controller/recorder 4 when the operation panel 42 is opened.

The controller/recorder 4 is formed of a controller/recorder main unit 41 and the operation panel 42 provided for the controller/recorder main unit 41 via a hinge 43 so that it can be opened and closed.

The controller/recorder main unit 41 has built-in circuits, which are described below, and also includes a liquid crystal display device (hereinafter simply referred to as the "LCD") 48, which serves as an LCD monitor, such that the user can check the LCD 48 when the operation panel 42 is opened. The LCD 48 is used for displaying information during a playback operation and for displaying a screen input via a connecting terminal 51 of a personal computer (PC) 51 which will be described below. In addition, the LCD 48 is used also for displaying menu screens for setting various modes of the information display apparatus 1. A recess 45 is also formed on the controller/recorder main unit 41 so that the user can place a finger when opening or closing the operation panel 42.

At the right side of the controller/recorder main unit 41, as shown in FIG. 6, a lid 52 that can be opened and closed with respect to the controller/recorder main unit 41 via a hinge 46 is provided. By allowing an engagement portion 52a of the lid 52 to engage with a mating engagement portion 52b provided for the controller/recorder main unit 41, the controller/recorder main unit 41 can remain closed. When the lid 52 is opened, as shown in FIG. 6, the cable connecting terminal 49 to be connected with the cable connecting terminal 21 of the head-mounted unit 2 via the cable 3, an AV/S connecting terminal 50 for connecting the controller/recorder 4 with a television set, and a PC connecting terminal 51 for connecting the controller/recorder 4 with a personal computer (PC) are exposed. In this manner, cords can be connected together at the right side surface of the controller/recorder main unit 41 without being extended from the other surfaces, thereby reducing a troublesome operation for arranging the cords.

Also at the left side of the controller/recorder main unit 41, as shown in FIG. 7, a lid 53 that can be opened and closed with respect to the controller/recorder main unit 41 via a hinge 47 is provided. By allowing an engagement portion 53*a* of the lid 53 to engage with a mating engagement portion 53*b* provided for the recorder/controller main unit 41, the controller/recorder main unit 41 can remain closed. When the lid 53 is opened, as shown in FIG. 7, a recording memory insertion slot 54 for inserting a recording memory 120 (see FIG. 11), which serves as detachable recording means, for example, a card memory, and a battery insertion slot 55 for detachably inserting batteries for supplying power are exposed.

On the outer surface of the operation panel 42, as shown in FIG. 5, a power switch 44 which is exposed even when the operation panel 42 is closed is provided. On the inner surface of the operation panel 42, various operation switches shown in FIG. 8 which are exposed only when the operation panel 42 is opened are disposed.

More specifically, on the inner surface of the operation panel 42, there are provided a speaker 56 for playing back sound, a switch 57 for increasing the volume of sound generated from the speaker 56, a switch 58 for decreasing the volume, a playback start/stop switch 59 for starting or pausing playing back image information recorded on the recording memory 120, a switch 61 for fast-forwarding and searching images in the backward direction, a switch 62 for fast-forwarding and searching images in the forward direction, a menu button 63 for displaying menu screens for setting various functions and dates concerning the information display apparatus 1 on the LCD 48, menu selection switches 66, 67, 68, and 69 for moving an item to be selected or scrolling information displayed on the menu screens in the top, bottom, left, and right directions, and a setting switch 65 for setting the selected item.

The information display apparatus 1 of this embodiment, if the time period when an image disappears from a frame for displaying the image exceeds a predetermined time period Ts, is automatically set to be in a low consumption power mode, and thereby, the consumption of the whole of the information display apparatus 1 is reduced. The predetermined time period Ts can be set by operating the menu selection switches 66, 67, 68, and 69, as descried below.

The switches disposed on the operation panel 42 are switches mainly for setting items of information which are not frequently changed.

The external appearance and the overview of the remote controller 5 are described below with reference to the plan view of FIG. 10.

As stated above, switches which are relatively frequently changed during a photographing operation are disposed on the remote controller 5. The remote controller includes, as shown in FIG. 10, a keyboard 71, a dome pointer operation portion 72, and an antenna 73.

The keyboard 71 is means for mainly inputting character-data. The character-data input through the keyboard 71 can be displayed on one or both of a see-through image display portion 6 (see FIG. 11) and the LCD 48 in the controller/recorder 4. In addition, the keyboard 71 contains a key which also functions as means for scrolling displayed items and character information in the top, bottom, left, and right directions.

The dome pointer operation portion 72 is scrolling means, and contains a pointer 74, a left button 75, and a right button 76. The pointer 74 is a pointing device which can move a mouse pointer, e.g., by operating the pointer 74 with a finger. That is, this operation of the pointer 74 corresponds to the operation of moving a mouse, which is generally adopted for personal computers or the like. Also, the left button 75 and the right button 76 correspond to the left button and the right button of an ordinary mouse. Thus, the mouse pointer is moved on a screen by operating the pointer 74, and the left button 75 or the right button 76 is operated at a desired location. This operation is equivalent to the movement and clicking of the mouse.

The antenna 73 is transmitting means by which information input to the remote controller 5 by the above-described operation is transmitted to the controller/recorder 4. The controller/recorder 4 executes processing in accordance with the operation contents, based on the information received from the remote controller 5.

Figure 11:
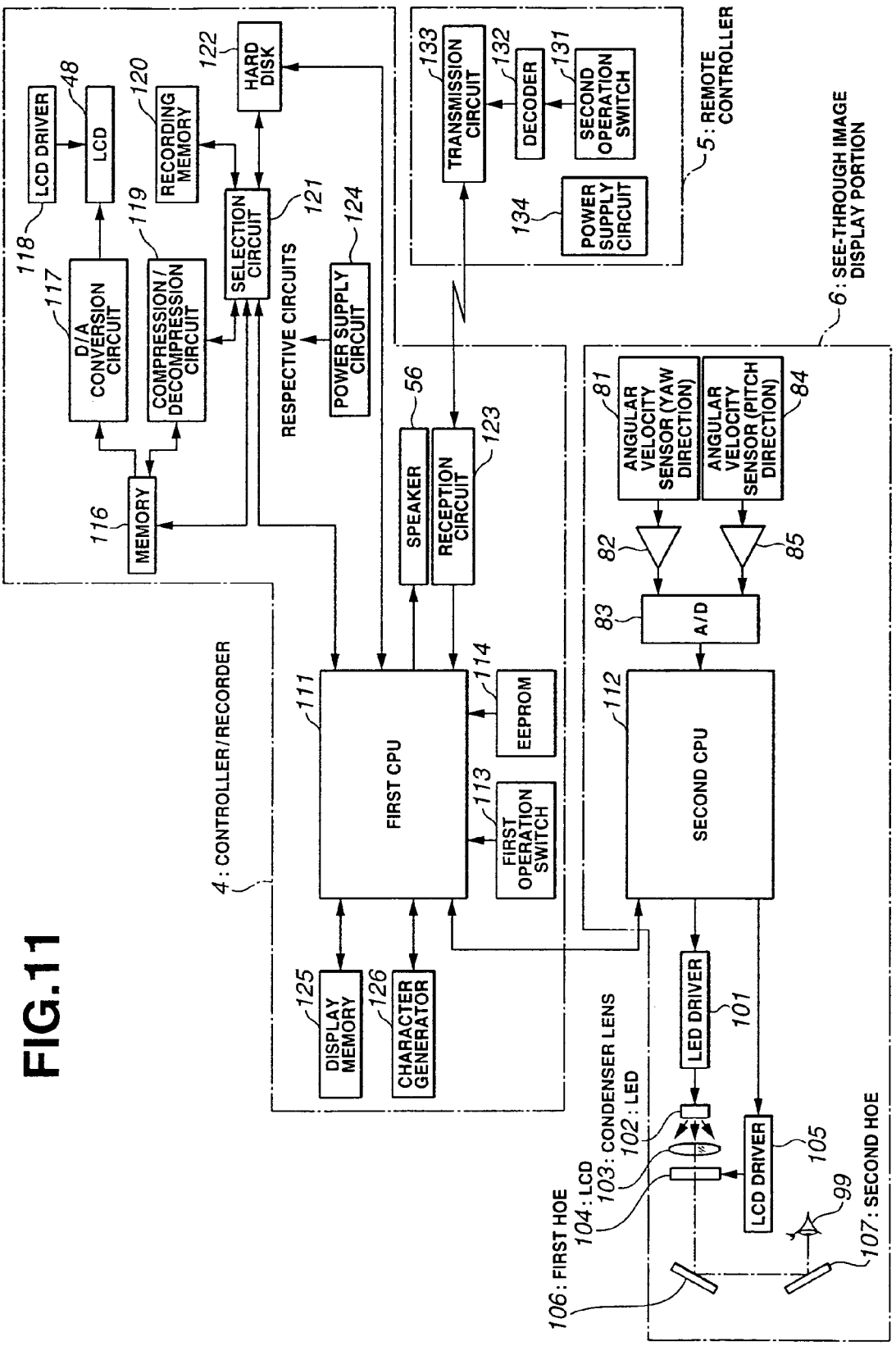
FIG. 11 is a block diagram illustrating the configuration of, mainly, an electronic circuit of the head-mounted camera of the same embodiment.

FIG. 11 is a block diagram illustrating the configuration of, mainly, an electronic circuit of the information display apparatus 1.

As stated above, the information display apparatus 1 includes the head-mounted unit 2, the controller/recorder 4, and the remote controller 5. The head-mounted unit 2 includes the see-through image display portion 6 as a main electronic circuit. The controller/recorder 4 and the see-through image display portion 6 are connected to each other through the cable 3. The controller/recorder 4 and the remote controller 5 are wirelessly connected to each other.

The controller/recorder 4 contains a memory 116, a D/A conversion circuit 117, the LCD 48, an LCD driver 118, a compression/decompression circuit 119, a selection circuit 121, the recording memory 120, a hard disc 122, the speaker 56, a reception circuit 123, a display memory 125, a character generator 126, a first operation switch 113, an EEPROM 114, a power supply circuit 124, and a first CPU 111.

The memory 116 is first memory means which constitutes displaying means, and is formed of, for example, a frame buffer for reading information such as images and characters generated by the first CPU 111, or information such as images and characters stored in the recording memory 120 and the hard disc 122 and temporarily storing the read signals.

The D/A conversion circuit 117 converts digital signals stored in the memory 116 to analogue signals.

The LCD 48 is the same as that shown in FIG. 9, and displays an image or other information, based on the analogue signals converted through the D/A conversion circuit 117.

The LCD driver 118 controls and drives the LCD 48.

The compression/decompression circuit 119 comprises a compression circuit portion and a decompression circuit portion. Digital signals stored in the memory 116 are compressed in the compression circuit portion. The digital signals read from the recording memory 120 and compressed are decompressed in the decompression circuit portion.

The selection circuit 121 caries out two-way selection, that is, decides the places which a signal is to be output from and is to be input to. In this case, according to the two-way selection, any one of the memory 116, the recording memory 120, the hard disc 122, and the compression/decompression circuit 119 may be the place from which a signal is output from and which a signal is input to. For example, the selection circuit 121 selects one from the recording memory 120, the hard disc 122, the memory 116, to which a digital signal compressed in the compression/decompression circuit 119 is to be output. In the case in which information stored in the recording memory 120 or the hard disc 122 is read into the memory 116 and is regenerated and displayed, the selection circuit 121 selects a signal output from either the recording memory 120 or the hard disc 122, based on a control signal from the first CPU 111 and outputs to the compression/decompression circuit 119. Moreover, the selection circuit 121 selects the data transfer from memory 116 to the recording memory 120 or the hard disc 122, or the data transfer from the recording memory 120 or the hard disc 122 to the memory 116 which is to be made via the compression/decompression circuit 119 or not. In the case in which the information is, e.g., image information excluding character data (hereinafter, information excluding character date is generally refereed to as image data), the transfer is carried out after the compression or decompression in the compression/decompression circuit 119. On the other hand, in the case of character data, the transfer is carried out, not through the compression/decompression circuit 119.

The recording memory 120 is formed of, for example, a detachable memory card. The recording memory 120, when it is selected by the selection circuit 121, stores digital signals compressed in the compression/decompression circuit 119.

The hard disc 122 is contained in the controller/recorder 4. The hard disc 122, when it is selected by the selection circuit 121, stores digital signals compressed in the compression/decompression circuit 119.

The speaker 56 (see FIG. 8) plays back sound, when an image is regenerated with the sound or generates alarm sound, if necessary, based on the control by the CPU 111.

The reception circuit 123 receives a signal wirelessly transmitted from a transmission circuit 133 of the remote controller 5, which will be described below.

The display memory 125 is second memory means which constitutes the display means, and stores image data to be displayed on the see-through image display portion 6. The display memory 125 is formed of memory cells one-to-one corresponding to the display pixels provided for LCD 104 in the see-through image display portion 6 which will be described below.

The character generator 126 generates character data corresponding to the key operation in the remote controller 5.

The first operation switch 113 is means which inputs for different operations concerning the information display apparatus 1, and also has functions of adjusting and time-setting. The first operation switch 113 contains different switches as shown in FIG. 8.

The EEPROM 114 is third memory means which constitutes display-controlling means, and stores different data used in the information display apparatus 1. In the EEPROM 114, a mapping coordination-relationship between original information stored in the memory 116 and the memory cells of the display memory 125 are stored as a table which will be described below.

The power supply circuit 124 is formed of, for example, detachable batteries and supplies power to the controller/recorder 4, and also supplies power to the see-through image display portion 6 of the head-mounted unit 2 via the cable 3.

The first CPU 111 controls the respective circuits in the controller/recorder 4, and also controls the see-through image display portion 6 by communicating with a second CPU 112, which will be described below, within the see-through image display portion 6. The first CPU 111 is systematic control means in this information display apparatus 1, and also functions as display means, display means, moving control means, and adjustment means.

Hereinafter, the principal operation of the controller/recorder 4 will be described.

Information in the memory 116 is compressed in the compression circuit portion of the compression/decompression circuit 119, and then, is stored in the recording memory 120 or the hard disc 122.

By operating the menu button 63 of the first operation switch 113, the menu selection switches 66, 67, 68, and 69, and a defining switch 65, information stored in the recording memory 120 or the hard disc 122 is selected. In the case in which the playback is instructed by operating the playback start/stop switch 59, the information stored in the recording memory 120 or the hard disc 122 is read and temporarily stored in the memory 116. In the case in which the information stored in the recording memory 120 or the hard disc 122 is image data, the information is decompressed in the decompression circuit portion of the compression/decompression circuit 119, and then is transferred to the memory 116. In the case in which the information stored in the recording memory 120 or the hard disc 122 is character data, the information is transferred from the selection circuit 121 directly to the memory 116 not via the compression/decompression circuit 119.

The information stored in the memory 116 is converted to analogue signals in the D/A conversion circuit 117. Thereafter, the information is displayed on the LCD 48, or is subjected to predetermined mapping and displayed on LCD 104, described below, of the see-through image display portion 6. When the information is displayed on the LCD 48, the operation of the LCD 48 is controlled by a signal generated from the LCD driver 118. On the other hand, when the information is displayed on the LCD 104 of the see-through image display portion 6, image data stored in the memory 116 is mapped to the memory cells of the of the display memory 125, referring to the table stored in the EEPROM 114. Thus, the image data mapped and stored in the display memory 125 is output to the LCD 104 of the see-through image display portion 6.

When keying-in operation is made through the keyboard 71 of the remote controller 5, the character generator 126 generates character data corresponding to the operation. The character data is synthesized with predetermined image data by the first CPU 111, is temporarily stored in the memory 116, and is displayed on the LCD 48 or the LCD 104 of the see-through image display portion 6 as described above.

The see-through image display portion 6 is display means by which by which images and characters are projected to the eyes 99 of an observer through a holographic optical element (hereinafter, abbreviated to HOE) as a reflection combiner, and are displayed as a virtual image on the front side in the visual field direction of the observer. Moreover, the see-through image display portion 6 also functions as means for detecting a tilting angle in the yaw and pitch directions of the head-mounted unit 2.

That is, the see-through image display portion 6 comprises an LED driver 101, LED 102, a condenser lens 103, an LCD 104, an LCD driver 105, a first HOE 106, a second HOE 107, an angular velocity sensor 81, an angular velocity sensor 84, an amplifier 82, an amplifier 85, an A/D converter 83, and a second CPU 112.

The LED driver 101 causes LED 102, described below, to emit light, based on the control by the second CPU 112.

The LED 102 is a light-emission source, that is, is driven by the LED driver 101 to emit light, and also is a component of the display means.

The condenser lens 103 collects light emitted from the LED 102, and is a component of the display means.

The LCD 104 is a display element formed of transmission type liquid crystal for displaying information such as images or the like, and is composed of a plurality of pixels, i.e., display picture elements, two-dimensionally arranged. The LCD 104 is a component of the display means, and is illuminated from the back side thereof with light emitted from the LED 102 via the condenser lens 103.

The LCD driver 105 causes the LCD 104 to be driven and display information such as images or the like, based on the control by the second CPU 112, and constitutes a part of the moving control means.

The HOE 106 is a reflective optical member for reflecting the emitted light via the LCD 104 in the vertical downward direction (see FIG. 16) while correcting for the aberration, which is described below. The first HOE 106 constitutes the display means.

The second HOE 107, which serves as a combiner, reflects and diffracts the light from the first HOE 106 toward the observer's eyes so that the information such as images and characters displayed on the LCD 104 is projected and, thus, can be observed, and also transmits external light toward the observer's eyes. The second HOE 107 constitutes the display means.

The angular velocity sensor 81 constitutes angle detection means, and detects the angle velocity in the yaw direction (see FIG. 13 described below) of the head-mounted unit 2.

The amplifier 82 amplifies output from the angular velocity sensor 81.

The angular velocity sensor 84 constitutes angle detection means, and detects the angle velocity in the pitch direction (see FIG. 12 described below) of the head-mounted unit 2.

The amplifier 85 amplifies output from the angular velocity sensor 84.

The A/D converter 83 converts the output of the angular velocity sensor 81 output via the amplifier 82 and the output of the angular velocity sensor 84 output via the amplifier 85 to digital signals, respectively, and outputs the signals to the second CPU 112.

The second CPU 112 comprises control means for mainly controlling the see-through image display portion 6, and also functions as display means, display control means, angle detection means, moving control means, and adjustment means. In addition, the second CPU 112 functions as angle detection means for detecting the tilting angle of the observer's head, based on the angular velocity information output from the angular velocity sensors 81 and 84. The second CPU 112 is connected to the first CPU 111 in a two-way manner, and thus, executes a predetermined operation in mutual communication and in cooperation with each other.

The remote controller 5 comprises a second operation switch 131, a decoder 132, a transmission circuit 133, a power supply circuit 134.

Figure 10:
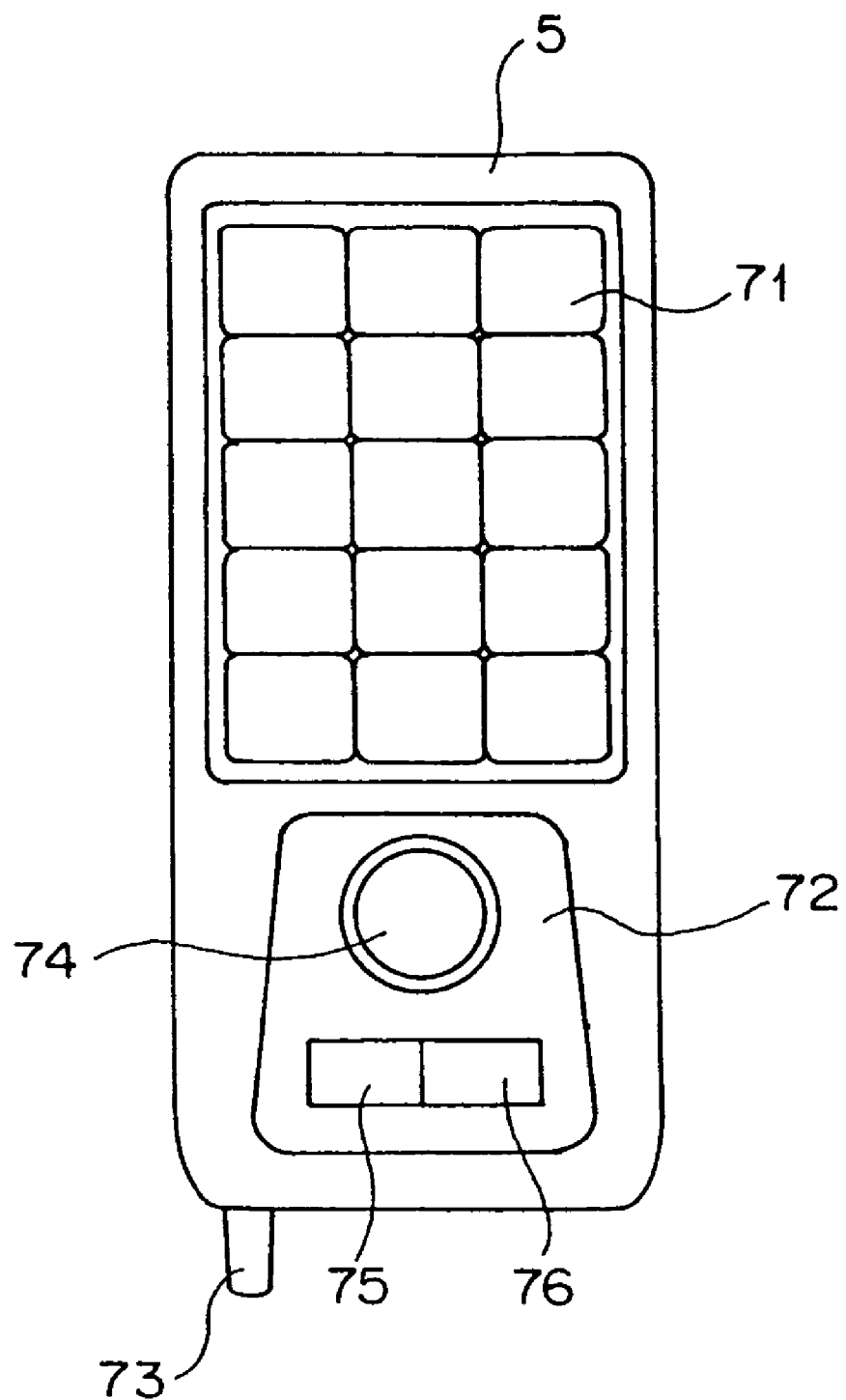
FIG. 10 is a plan view illustrating the configuration of a remote controller in the same embodiment.

The second operation switch 131, which serves as input means, contains switches shown in FIG. 10, and also functions as adjustment means and time-setting means.

The decoder 132 coverts an input operation from the second operation switch 131 to a signal suitable for wireless transmission.

The transmission circuit 133 wirelessly transmits the signal converted by the decoder 132 to a reception circuit 123 of the controller/recorder 4 via the antenna 73.

The power supply circuit 134 contains batteries or the like, and provides power supplied for the respective circuits in the remote controller 5.

Figure 12:
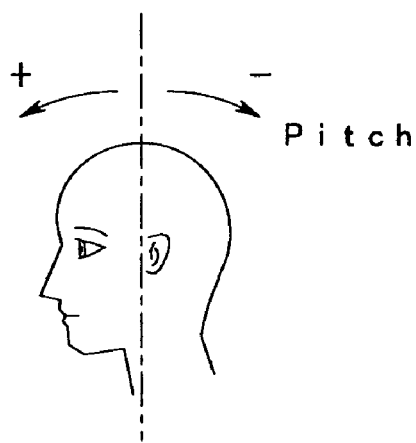
FIG. 12 illustrates the pitch direction.
Figure 13:
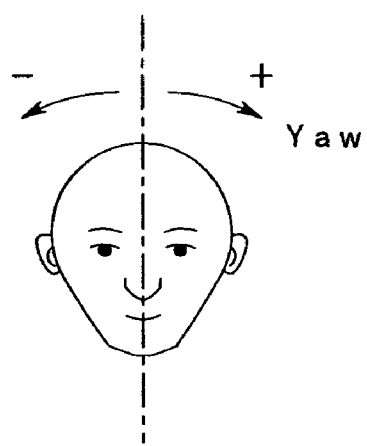
FIG. 13 illustrates the yaw direction.
Figure 14:
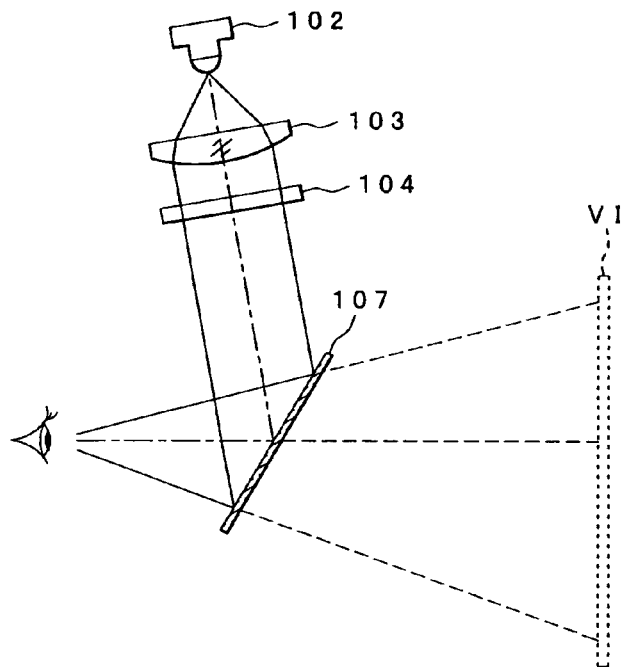
FIG. 14 illustrates the principle of an optical system of a see-through image display portion in the same embodiment.
Figure 15:
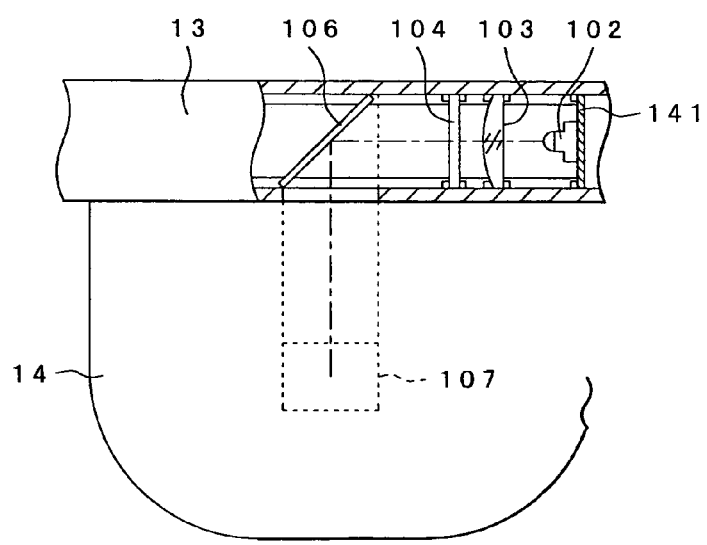
FIG. 15 is a front view, partially in section, illustrating the optical system of the see-through image display portion in the same embodiment.
Figure 16:
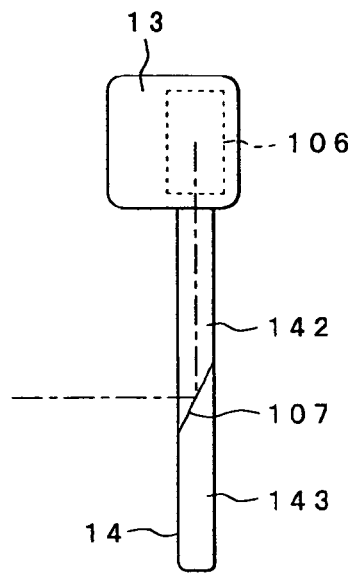
FIG. 16 is a left side view illustrating an example of the configuration of the optical system of the see-through image display portion in the same embodiment.
Figure 17:
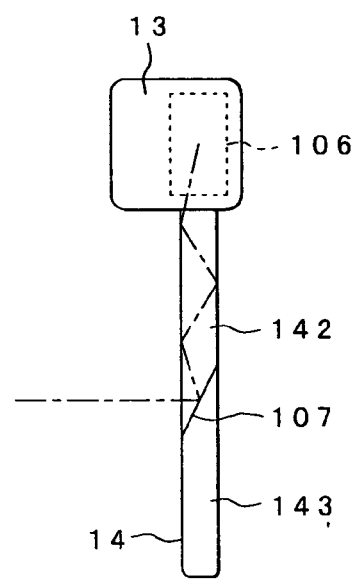
FIG. 17 is a left side view illustrating another example of the configuration of the optical system of the see-through image display portion in the same embodiment.
Figure 18:
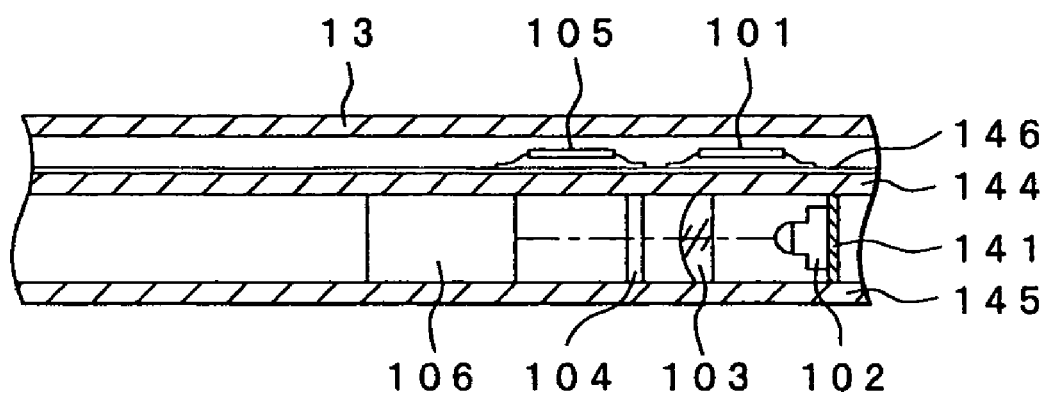
FIG. 18 is a cross-sectional plan view illustrating the configuration of the optical system of the see-through image display portion in the same embodiment.

Hereinafter, mainly, the optical configuration of the see-through image display portion 6 is described with reference to FIGS. 12 to 18. FIG. 12 illustrates the pitch direction. FIG. 13 illustrates the yaw direction. FIG. 14 illustrates the principle of the optical system of the see-through image display portion 6. FIG. 15 is a front view, partially in cross-section, illustrating an example of the optical system of the see-through image display portion 6. FIG. 16 is a left side view illustrating an example of the configuration of the optical system of the see-through image display portion 6. FIG. 17 is a left side view illustrating another example of the configuration of the optical system of the see-through image display portion 6. FIG. 18 is a cross-sectional plan view illustrating the configuration of the optical system of the see-through image display portion 6.

In the see-through image display portion 6, image and character information can be superimposed as a virtual image on a subject which is substantially directly observed by the observer. Such a display mode is referred to as the "see-through display". The term "substantially directly observed" includes not only a case where the observer observes the subject directly with his/her eyes, but also a case where the observer observes the subject through a generally planar transparent member formed of, for example, glass or plastic, or a case where the observer observes the subject through an eyesight-correcting lens.

First, terms concerning the tilting of the head will be described below with reference with FIGS. 12 and 13. The term "pitch direction" means "the tilting of the head in the front and back direction" as shown in FIG. 12. The term "yaw direction" means "the tilting of the head in the right and left direction" as shown in FIG. 13. The head-mounted unit 2 is formed so as to be used while it is put on the head of an observer. The detection of the tilting of the head-mounted unit 2 has substantially the same meaning as the detection of the tilting of the head of the head.

The principle of displaying see-through images by the optical system of the see-through image display portion 6 (hereinafter referred to as the "see-through image display optical system") in this embodiment is described below with reference to FIG. 14.

Light emitted from the LED 102 is condensed by the condenser lens 103 and illuminates the LCD 104 from backward. The LED 102 contains diodes capable of emitting light rays presenting three colors, i.e., R (red), G (green), and B (blue) colors. In the case in which character information is displayed, only the diode for G (green) can be caused to emit, for example.

The second CPU 112 generates a signal corresponding to an image, a character, or the like, and outputs it to the LCD driver 105. The LCD driver 105 drives the LCD 104 based on the signal to allow the LCD 104 to display the image and the character.

The image and the character output from the LCD 104 receiving light from the LED 102 are reflected by the second HOE 107 and is guided to the observer's eye. Then, the observer can observe the image and the character as a virtual image VI. The first HOE 106 is not shown since only the principle is illustrated in FIG. 14.

The second HOE 107 is a volume-phase holographic optical element using a photosensitive material, such as photopolymer or dichromated gelatin, and is designed to reflect light having R, G, and B wavelengths emitted from the LED 102 with the maximum reflectivity. Accordingly, when emitting G light to display a character, the green character is clearly displayed as a virtual image. When a color image is displayed so that it can be observed, the color image is displayed on the LCD 104, and simultaneously, the LED 102 is caused to emit three colors, i.e., R, G, and B type of light. The HOE exhibits an excellent wavelength selectivity, and more specifically, the HOE exhibits high reflection characteristics for the R, G, and B wavelength light with extremely narrow wavelength bands and exhibits high transmission characteristics for the other wavelength light. Accordingly, external light having the same wavelength range as the display light is diffracted and reflected and does not reach the observer's eyes, but external light having the other wavelength ranges reaches the observer's eyes. Generally, since visible light has a wide wavelength interval, an external image can be observed without any problem even if light having very narrow wavelength intervals including the R, G, and B wavelengths does not reach the observer's eye.

The first HOE 106 reflects light from the LCD 104 toward the second HOE 107, and also has a function of correcting for the curvature of field. Although in this embodiment the first HOE 106 is used, a free-form optical element may be used. Although the free-form optical element is light and small, it can correct for the complicated aberration, and thus, clear images with small aberration can be displayed without increasing the weight of the head-mounted unit 2.

Specific arrangements of the see-through image display optical system are described below with reference to FIGS. 15 to 18.

On the subject side in the portion inside the frame 13 and above the transparent optical member 14 (and/or the transparent optical member 15), the LED 102, the condenser lens 103, the LCD 104, and the first HOE 106 are disposed in the order shown in FIG. 15. Those elements are sandwiched between support frames 144 and 145 to be fixed as shown in FIG. 18. In this case, the LED 102 is fixed by the support frames 144 and 145 while being mounted on an electronic circuit board 141. The first HOE 106 is tilted so that it can reflect light from the LED 102 vertically downward.

The transparent optical member 14 (and/or the transparent optical member 15) includes, as shown in FIGS. 16 and 17, optical waveguide members 142 and 143 formed of transparent glass or plastic to have a predetermined thickness and the second HOE 107 tilted between the optical waveguide members 142 and 143 to reflect light backward. With this configuration, light reflected by the first HOE 106 propagates inside the optical waveguide member 142 disposed above the second HOE 107 and reaches the second HOE 107. The propagation of light inside the optical waveguide member 142 may be only the transmission, as shown in FIG. 16, or a combination of the transmission and internal total reflection from the inner wall may be employed as shown in FIG. 17. If the optical system is designed to implement a combination of the transmission and the total reflection, the transparent optical member 14 (and/or the transparent optical member 15) can be thin-walled, thereby further reducing the weight of the head-mounted unit 2.

On the observer's head side (opposite to the subject) in the inside of the frame 13, an electric circuit substrate 146 having the LED driver 101 and the LCD driver 105 mounted thereon is disposed on the side opposite to the see-through image display optical system in such a manner that the support frame 144 is sandwiched between the substrate 146 and the optical system.

The see-through image display optical system includes the LED 102, the condenser lens 103, the LCD 104, the first HOE 106, the second HOE 107, and the optical waveguide members 142 and 143.

In general, the following two examples of the arrangement of the see-through image display portion 6 may be presented since an observer ordinarily observes a subject with his/or her eyes.

First, in the first example, such a see-through image display optical system as shown in FIG. 15 forms a part of the see-through image display portion 6 corresponding to one of both eyes, while a transparent optical member having no see-through image-display function forms the other part of the see-through image display portion 6 corresponding to the other eye. In this case, desirably, the transparent optical member for the other eye has the same visual sensitivity transmission characteristic as the transparent optical member 14 (and/or the transparent optical member 15). Thereby, the fatigue of the eyes can be reduced even if the information display apparatus is used for a long time-period.

In the second example, such a see-through image display optical system as shown in FIG. 15 is formed in correspondence to each of both eyes. In the case of a pair of the see-through image display optical systems, the fatigue of the eyes can be further reduced. In addition, an image can be stereoscopically displayed, if necessary.

The structure for electrically connecting the electric equipment of the front portion 11 and the electric equipment 30a of the temple 12 to each other will be described below, with reference to FIGS. 19 and 20. FIG. 19 is a plan view, partially in cross-section, illustrating the structure of the joint portion containing the front portion 11, a hinge portion 200, and the temple 12. FIG. 20 is a view illustrating the joint portion of the hinge 200 and the temple 12, viewed from the left side substantially toward the right side in FIG. 19.

In this case, the hinge portion 200 is defined as a portion, containing the hinge 24, for connecting the temple 12 and the front portion 11 (or the frame 13) to each other.

In this information display apparatus 1, as shown in FIG. 3, the right and left temples 12 are positioned at a right angle to the front portion 11 when the device is in use, and can be folded toward the inner side to the front portion 11 with the hinges 24 and 25 as the rotational center. The hinge portion 200 containing the hinge 24 on the right side and its neighborhood will be described below. The hinge portion containing the hinge 25 on the left side can be described in a similar manner.

The hinge 24 of the hinge portion 200 is formed as a knee-type joint. As shown in FIG. 20, a U-shaped bearing 193 having a cylindrical threaded hole 193a formed on the front portion 11 side, and a bearing 194 having a cylindrical hole 194a formed on the temple 12 side are combined with each other so that the holes 193a and 194a communicate with each other. A shaft 191, which functions as connecting pin, is inserted into the holes 193a and 194a. Thus, the hinge 24 is formed. In FIG. 20, the portion of the hinge 24 belonging to the temple 12 is hatched with dotted lines.

Figure 19:
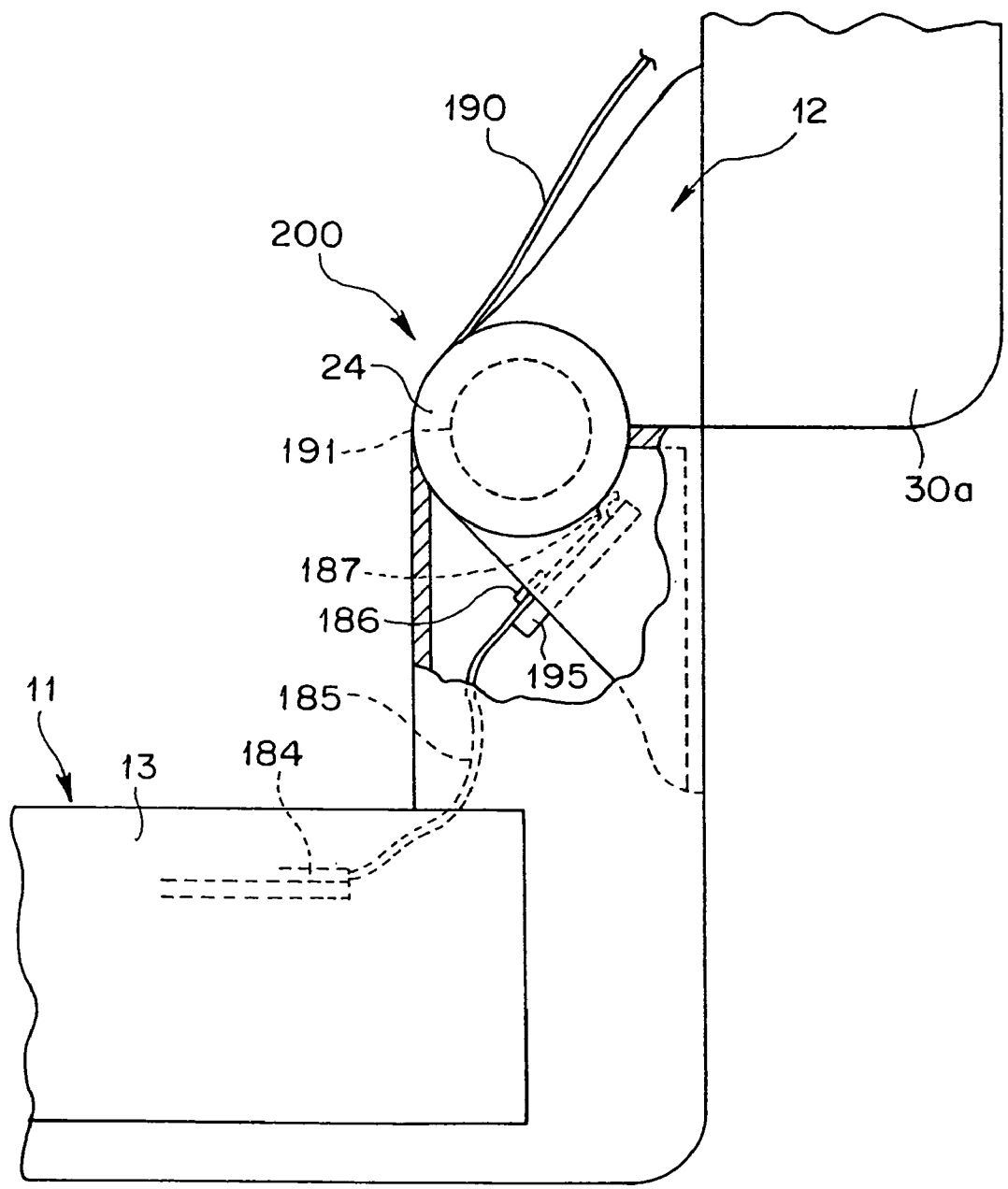
FIG. 19 is a plan view, partially in section, illustrating the structure of a joint portion containing a front portion, a hinge, and a temple in the same embodiment.
Figure 20:
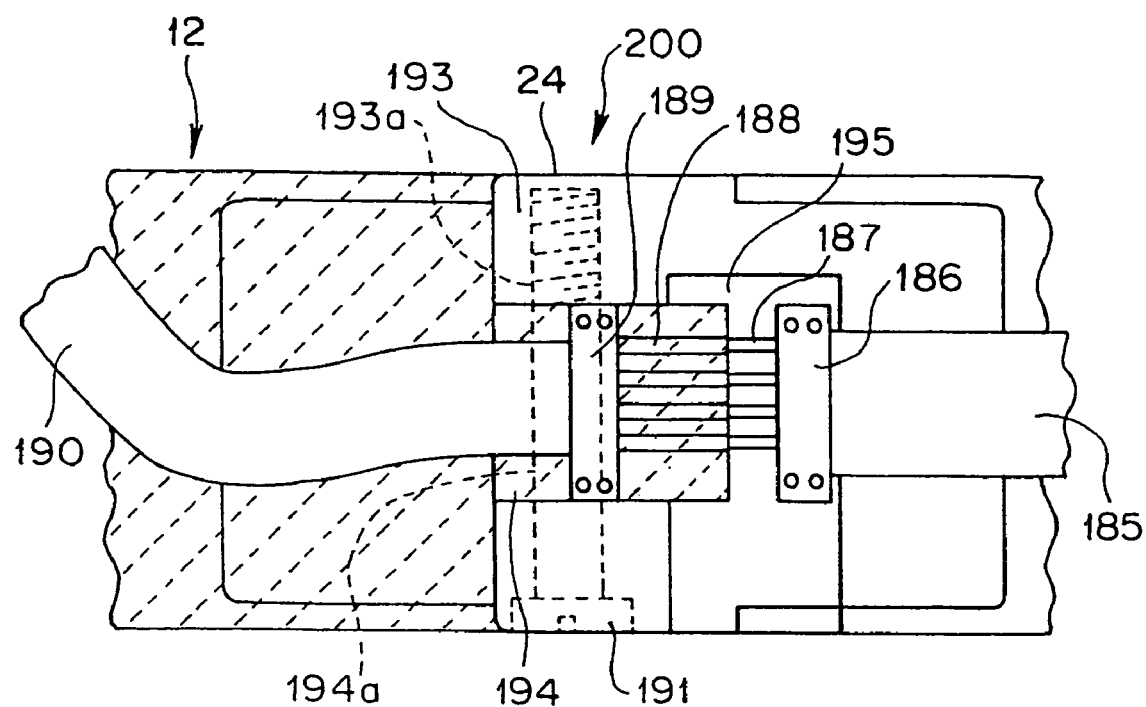
FIG. 20 is a view showing the joint portion containing the hinge and the temple seen from the left side substantially in the right direction in FIG. 19.

As shown in FIG. 19, an electric circuit substrate 184 is provided for the front portion 11. The electric circuit substrate 184 is electrically connected to one end-side of a flexible printed circuit substrate 185. The flexible printed circuit substrate 185 is disposed so as to range from the inside of the front portion 11 to the inside of the hinge portion 200. The other end-side of the flexible printed circuit substrate 185 are electrically connected to plural contacts 187, as shown in FIG. 20. These contacts 187 are provided on a wall 195 formed upright in the hinge portion 200. The connection between the flexible printed circuit substrate 185 and the respective contacts 187 is performed via a connection portion 186.

Conductors 188 are formed on the bearing 194 on the temple 12 side formed so as to be relatively rotated with respect to the bearing 193 on the front portion 11 side. The conductors 188 are coaxial contacts positioned in an arch pattern on the outer periphery of the bearing 194 and extending along the axial direction. The conductors 188 correspond to the plurality of contacts 187, and are embedded in an insulator. The exposed surfaces of the conductors 188 are plated with, e.g., gold. The overall surfaces of the conductors 188 may be plated with gold.

With the above-described configuration, the contacts 187 and the conductors 188 can be maintained in the electrically conducting state, even if the front portion 11 and the temple 12 are relatively rotated. It is not necessary to dispose a cable, a printed circuit substrate, or the like for connection between circuit portions such as the LED driver 101 and the LCD driver 105 concerning the projection of an image, and circuit portions provided in the electric equipment 30*a*. Thus, the appearance is simple and is kept in order. Particularly, the head-mounted unit 2 of the information display apparatus 1 is put on the head, when the information display apparatus 1 is used. Thus, the appearance of the head-mounted unit 2 is remarkable for others. Thus, the above-described structure is very advantageous.

On the peripheral surface of the bearing 194, the contacts 187 are electrically connected to one-end side of the flexible printed circuit substrate 190 via the connection portion 189 on the peripheral surface of the bearing 194. The other-end side of the flexible printed circuit substrate 190 is connected to the electric circuit substrate concerning the electric equipment 30*a* of the temple 12 (not shown). Further, the other-end side is connected to the controller/recorder 4 via the cable 3.

With this configuration, a signal for driving the LED driver 101 and the LCD driver 105 of the see-through image display portion 6 disposed in the frame 13 is transmitted, e.g., from the second CPU 112 disposed in the electric equipment 30*a*. In the case in which the electric equipment 30*b* is provided with the angular velocity sensors 81 and 84, the amplifiers 82 and 85, and the A/D converter 83, a detection signal output from these devices is transmitted to the second CPU 112 of the electric equipment 30*a* via the front portion 11 in a similar manner as described above.

Figure 21:
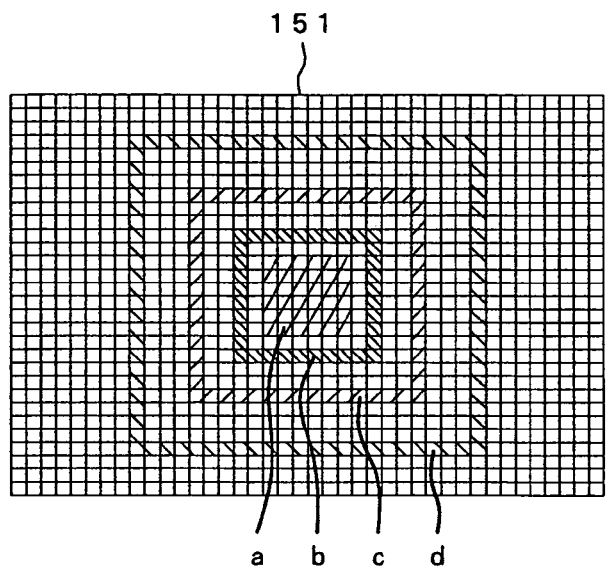
FIG. 21 illustrates an example of an original image to be displayed in the same embodiment.
Figure 22:
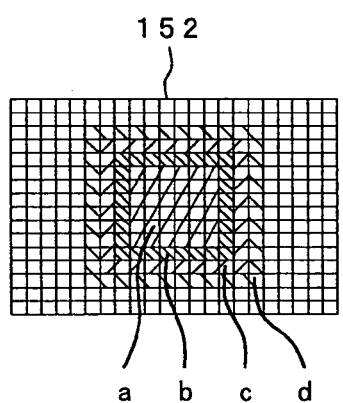
FIG. 22 illustrates the correspondence between the pixels of LCD and the original image in the same embodiment.
Figure 23:
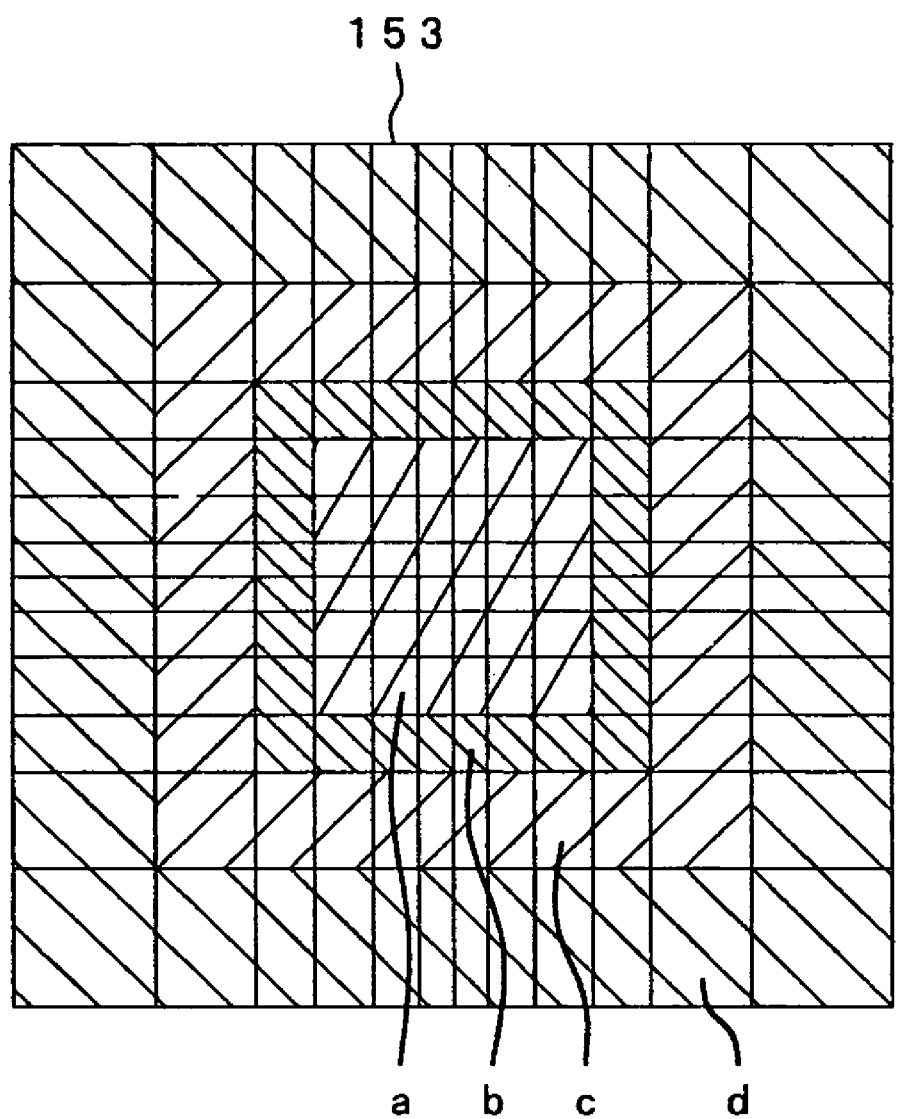
FIG. 23 illustrates an example of the correspondence between a projection image as a virtual image and the original image in the same embodiment.

Hereinafter, the display of an image, which is carried out by the information display apparatus 1, is described with reference to FIGS. 21 to 23. FIG. 21 illustrates an original image to be displayed. FIG. 22 illustrates the coordination between the pixels of LCD 104 and the original image. FIG. 23 illustrates the coordination between the image as a virtual image formed by projection of the original image and the original image.

It is assumed that an original image 151 to be displayed is one shown in FIG. 21. To make clear the coordination between the original image 151, the image displayed on the LCD 104, and the image observed as a virtual image, the original image 151 is appropriately divided into areas, and the areas are hatched. The image areas hatched in the same pattern, shown in FIGS. 21 to 23, corresponds to each other. The original image data is stored in the memory 116.

In FIG. 21, one square corresponds to one of the pixels forming the original image 151. In the case in which the original image 151 is image data obtained, e.g., through an image capturing device, one square corresponds to one pixel of the image capturing device. The information of the respective pixels shown as the above-described squares is stored in the memory 116.

In the original image 151 shown in FIG. 21, the center pixel area of 6×6 is represented by area a. The area surrounding the area a at an interval of one pixel, of which one side is composed of ten pixels, and the width is one pixel, is represented by area b. The area surrounding the area b at an interval of two pixels, of which one side is composed of sixteen pixels, and the width is one pixel, is represented by area c. The area surrounding the area c at an interval of three pixels, of which one side is composed of twenty four pixels, and the width is one pixel, is represented by area d. Thus, the width between the areas becomes larger in the order of from the center area a toward the peripheral area d.

FIG. 22 shows the display surface 152 of the LCD 104 as a display element. In FIG. 22, one square on the display surface 152 represents one display-pixel. The display image data for the LCD 104 is stored in the display memory 125. In this case, data to be displayed using display pixels is stored in the memory cells of the display memory 125 in such a manner that one display pixel corresponds to one memory cell. In this case, the display image date stored in the display memory 125 is prepared, e.g., from the original image data stored in the memory 116, by mapping with looking up the table stored in the EEPROM 114, as follows. That is, in the table stored in the EEPROM 114, there are preliminarily stored the location in the LCD 104, shown in FIG. 22, to which the pixel data at a location shown in FIG. 21 is to be mapped, that is, the memory cell at the address in the display memory into which the information stored at the respective addresses in the memory 116 having the original image data 151 stored therein is to be mapped.

More specifically, the image data in the area a shown in FIG. 21 is displayed in the central area a composed of 6×6 display pixels of the LCD 104. Thus, regarding the image data in the area a, a constant resolution can be kept in the horizontal/vertical direction (the resolution of the original image). The image data in the area b is displayed in the periphery of the area a, close to the area a, that is, with no interval provided between the areas a and b. However, one side of the area b displayed in this case is composed of eight display-pixels. On the other hand, one side of the area b of the original image 15 is composed of ten pixels. Therefore, the mapping is suitably carried out looking up the table in the EEPROM 114. The mapping is substantially diminished pixel processing by which the ten pixels per one side are converted to eight pixels per one side. Also, in the LCD 104, the area c is arranged on the outside of the area b without no interval provided between the areas b and c. Thus, one side of the area c is composed of ten display pixels. Therefore, the area c is mapped in such a manner that sixteen pixels per one side are diminished to ten pixels per one side. Moreover, in the LCD 104, the area d is arranged on the outside of the area c without no interval provided between the area d and c. One side of the area d is composed of twelve pixels. Thus, the area d is formed by mapping in such a manner that twenty four pixels per one side are diminished to twelve display pixels per one side.

When the display image shown in FIG. 22 is projected through the see-through image display optical system, the image shown in FIG. 23 is observed as a virtual image 153 at a predetermined distance and position. That is, the observed virtual image 153 has such that he display image on the LCD 104 extends more and more in the direction of from the center thereof toward periphery. In details, the pixels of the virtual image 153 extends toward the periphery in such a manner to have the same positional relationship (i.e., the positional relationship of similarity) to the corresponding pixels of the original image 151. Thus, the see-through image display optical system is designed to cause the original image to extend more and more in the peripheral direction and restore the positional relationship between the pixels of the original image 151.

The resolution of the virtual image 153 shown in FIG. 23 decreases more and more in the peripheral direction. This is designed in conformity to the characteristic of a human being in which the visual acuity rapidly decreases in the direction of from the center of the retina toward the periphery thereof. Thus, no practical problems occur, as far as an observer carefully sees the center of the virtual image.

With the above-described configuration, the number of the display pixels constituting the LCD 104 can be reduced, and thereby, the size and the cost of the information display apparatus 1 can be reduced.

As regards the relationship illustrated in FIGS. 21 and 22, the display pixels shown in FIG. 22 are formed by removing some of the pixels of the original image 151 shown in FIG. 21 (that is, sampling). This is not restrictive. A display pixel may be formed by calculation of plural pixel data of the original image 151 (that is, interpolation). In the sampling using the removal of some pixels, the load to the processing is relatively low. Thus, advantageously, the processing can be performed at a high speed and a low consumption power. On the other hand, in the case of the calculation by interpolation, the image can be displayed more accurately with respect to the original image 151.

Figure 24:
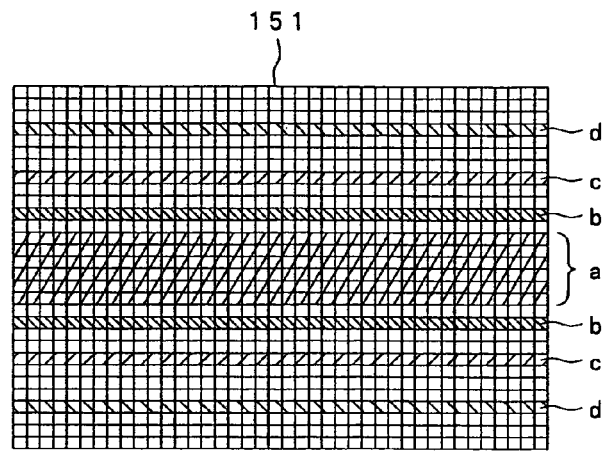
FIG. 24 illustrates another example of the original image to be displayed in the same embodiment.
Figure 25:
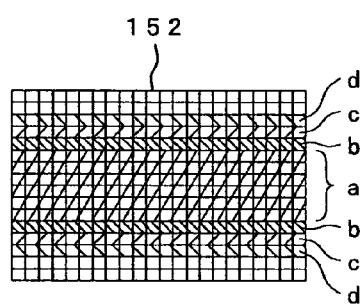
FIG. 25 illustrates another example of the correspondence between the pixels of the LCD and the original image in the same embodiment.
Figure 26:
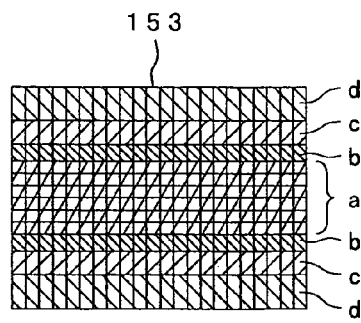
FIG. 26 illustrates another example of the correspondence between the projection image as a virtual image and the original image in the same embodiment.

FIGS. 24 to 26 illustrate other examples of the display of an image carried out by the information display apparatus 1. FIG. 24 illustrates an original image to be displayed. FIG. 25 illustrates the coordination between the pixels of the LCD 104 and the original image. FIG. 26 illustrates the coordination between the image as a virtual image formed by projection and the original image.

In the examples shown in FIGS. 21 to 23, the resolution is reduced two-dimensionally in the direction of from the center of the screen toward the periphery thereof, that is, in the vertical and horizontal directions. On the other hand, in the examples of FIGS. 24 to 26, the resolution only in the vertical direction on the screen is changed.

In the original image 151 shown in FIG. 24, each of the areas a, b, c, and d has the same width in the horizontal direction as that of the whole screen. In particular, the area a contains the central portion of the original image 151, that is, is set so that six pixels are arranged in the vertical direction as in the central portion of the original image, and the same number of pixels as that on the whole screen are arranged in the horizontal direction. The areas b are set on the upper and lower sides of the area a with an interval of one pixel provided between the areas a and b. Each of the areas b is formed in a belt-shape in which the width in the vertical direction is equal to one pixel, and the length in the horizontal direction is the same as that of the whole screen. The areas c are set on the upper and lower sides of the area b with an interval of two pixels provided between the areas b and c. Each of the areas c is formed in a belt-shape in which the width in the vertical direction is equal to one pixel, and the length in the horizontal direction is the same as that of the whole screen. The areas d are set on the upper and lower sides of the area c with an interval of three pixels provided between the areas c and d. Each of the areas d is formed in a belt-shape in which the width in the vertical direction is equal to one pixel, and the length in the horizontal direction is the same as that of the whole screen.

Thus, the areas a, b, c, and d are formed in such a manner that the interval between the areas becomes larger in the order of from the area a, i.e., the central portion, to the areas d, the peripheral portion in the perpendicular direction. Thus, in the example of FIG. 24, the sampling is carried out in such a manner that the resolution in the vertical direction is lowered toward the ends in the vertical direction, while the resolution in the horizontal direction is kept constant.

FIG. 25 shows the display surface 152 of the LCD 104 as a display element.

The image data in the area a is displayed in the area a which is the central portion of the LCD 104, and is composed of six pixels in the vertical direction and the horizontal overall pixels in the horizontal direction. Thus, for the image data in the area a, the resolution is kept constant in both of the horizontal and vertical directions (in particular, in the example of FIGS. 24 and 25, the resolution of the original image in the vertical direction is kept, but the resolution in the horizontal direction is reduced corresponding to the relationship between the number of the horizontal overall pixels of the original data and the number of the horizontal overall pixels of the LCD 104). The image data in the area b is displayed on the upper and lower sides of the image a close to the area a, i.e., with no interval provided between the images a and b. The image data in the areas c is displayed on the LCD 104 on the outer sides of the areas b with no interval provided between the images b and c. The areas d are arranged on the LCD 104 on the outer sides of the areas c with no interval provided between the areas c and d. In this case, the mapping from the original image 151 to the LCD 104 (that is, the mapping from the memory 116 to the memory cells of the display memory 125) is carried out looking up the table in the EEPROM 114 as in the above-described case.

The pixel configurations in the vertical and horizontal directions of the LCD 104 are constant. On the other hand, the pixel configurations in the vertical and horizontal directions of original images to be displayed are different (for example, static images, dynamic images, images with different resolutions, vertically positioned images, horizontally positioned images, and so forth). Thus, it is difficult to store table data for mapping any type of original images in the EEPROM 114. Accordingly, only the table data for mapping original images having such pixel configurations as are generally used is stored in the EEPROM 114, and for the other original images, the CPU 111 may be caused to operate and map them. In the above-described system, typical data can be processed at high speed to be displayed, and original image data having such pixel configurations as not stored as the table can be displayed in a desired manner.

FIG. 26 shows the image which is observed as a virtual image at a predetermined distance and position, obtained when the display image on the LCD 104 shown in FIG. 25 is projected through the see-through image display optical system. Particularly, the observed virtual image 153 extends more and more in the vertical direction from the center toward the upper and lower peripheral portions. Accordingly, the see-through image display optical system causes an image to become larger and larger in the vertical direction toward the peripheral portions thereof. In this case, the virtual image 153 is extended in the vertical direction in such a manner that the pixels of the virtual image 153 have the same positional relationship (the positional relationship of similarity) as the corresponding pixels of the original image 151, similarly to the above-described case.

Accordingly, the resolution of the virtual image shown in FIG. 25 decreases more and more toward the peripheral portions in the vertical direction, while the resolution in the horizontal direction is kept constant.

In the case in which a configuration realizing the coordination relationship between the pixel data shown in FIGS. 24 to 26 is employed, image data can be easily mapped from the memory 116 to the display memory 125 compared with the mapping in which the resolution is changed in the two-directional direction, since with the above-described configuration, the resolution of an image observed by an observer is changed only in one-dimensional direction.

In addition to the examples of FIGS. 21 to 23 and those of FIGS. 24 to 26, mapping in which the resolution is lowered corresponding to only the distance from a predetermined position as a center (e.g., the central position of a display surface), irrespective of directions starting from the center, in other words, the mapping in which the resolution is lowered toward the concentric periphery thereof can be carried out.

The examples of FIGS. 21 to 26 are presented for description of the technical idea. Accordingly, the examples are different from the practical configurations of an original image and the LCD 104 (that is, the number of picture-elements or pixels practically employed is higher, and also, for the original image, a variety of pixel-configurations are used, as described above). Therefore, the number of pixels and the sampling interval of an original image have different values depending on the designs.

In the below-description, the mapping of an original image onto the LCD 104 as a display element is referred to as first mapping, and the process of displaying the image mapped to the LCD 104 by means of the optical system is referred to as second mapping. In order that the observed images shown in FIGS. 23 and 26 have shapes of similarity to the original images shown in FIGS. 21 and 24, it is necessary that the first and second mapping have a back-mapping relationship to each other (strictly speaking, the back-mapping relationship is impossible, since the irreversible change occurs in which the number of pixels is reduced. Thus, the first and second mapping is set in such a manner that the back-mapping is possible with respect to the geometrical positional relationship). To assure the relationship, it is more convenient to adjust the mapping by programming in conformity to the characteristics of the optical system rather than to determine the characteristics of the above-described optical system in conformity to the above-described mapping.

As described above, according to the present technique, the original image is displayed on the display element in such a manner that the resolution becomes lower and lower in the direction of from the center to the periphery, and then, the image displayed on the display element is displayed so as to be magnified more and more toward the periphery through the optical system.

Hereinafter, the operation carried out when the information of the original image stored in the memory 116 is mapped to the respective addresses in the display memory 125 and displayed on the LCD 104 will be described.

The original image, which is an object to be displayed, is stored in the memory 116 shown in FIG. 11. For example, it is assumed that the original image is a high precision image. As described above, there is preliminarily stored in the EEPROM 114 as the table which coordinates between the data at each address in the memory 116 and the address in the display memory 125 at which the data should be written.

The memory addresses in the display memory 125 are coordinated with the corresponding pixels in the LCD 104 in the one-to-one relationship. The LCD 104 is driven by the LCD driver 105, so that the data in the display memory 125 is displayed as an image.

In the above-described configuration, the first CPU 111 causes the data in the memory 116 to be mapped to the respective addresses in the display memory 125, looking up the table stored in the EEPROM 114.

The table stored in the EEPROM 114 realizes the back-mapping of the mapping which is carried out by the see-through image display optical system for projecting an image as a virtual image in such a manner that the image is magnified more and more toward the periphery thereof. Accordingly, the table can be calculated by calculating the mapping based on the optical characteristics (the optical characteristics may be ones defined by the design or ones obtained by measuring each product considering the individual difference or the like of the optical system), calculating the back-mapping, and then processing for diminished pixel number.

The information mapped to the display memory 125 is displayed on the LCD 104, and is reflected by the first HOE 106, and is guided through the second HOE 107 as a combiner to the eyes 99 of an observer.

Thereby, the observer can observe the image shown in FIG. 23 or 26 as a virtual image at a predetermined position.

The table stored in the EEPROM 114 is determined by the design as described above. However, there is a possibility that different manufacturing-errors occur during the process of producing the information display apparatus 1. These errors are corrected by the following means.

Figure 27:
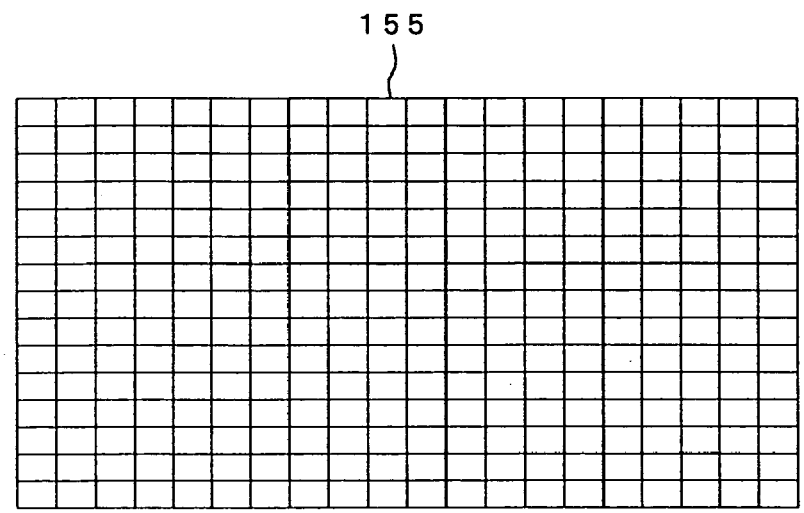
FIG. 27 shows an example of a test chart in the same embodiment.

For the above-described correction, the image of a test chart as shown in FIG. 27 is prepared as an original image and is stored in the memory 116. FIG. 27 shows an example of the test chart. This test chart 155 is formed by drawing straight lines in a square-pattern in which, e.g., a plurality of straight lines are arranged in the vertical and horizontal directions at the same intervals, respectively.

The data of the test chart 155 stored in the memory 116 is mapped to the display memory 125 looking up the table stored in the EEPROM 114.

The data stored in the display memory 125 is displayed on the second LCD 112, and is projected through the see-through image display optical system containing the first HOE 106 and the second HOE 107 to the eyes of an observer as a virtual image of which the peripheral portion is magnified. The observer can observe a figure similar to the test chart 155 stored in the memory 116.

The image displayed via the second HOE 107 is photographed by an image capturing device which is provided to acquire the correction data for manufacture-correction. The image capturing device eliminates the distortion of an image, or is such that the information of the image distortion is known. Based on the image data obtained by the image capturing device, information concerning the geometrical distortion of the test chart 155 is analyzed and acquired. The table in the EEPROM 114 is modified in such a manner that the correction can be carried out based on the analytical data. Desirably, the image data obtained by the image capturing device is displayed on an adjustment monitor so that the displayed image and the state in which the image is corrected can be observed.

Figure 28:
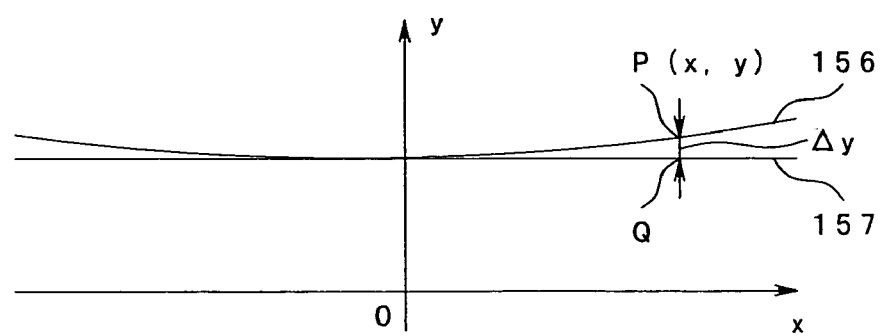
FIG. 28 illustrates a straight line in the horizontal direction in the test chart shown in FIG. 27 obtained before and after modification.

For example, it is assumed that a line which should be displayed as a straight line in the horizontal direction (i.e., the line is a line 157 obtained after the modification) is displayed as a curved line 156 curved upward more and more toward the ends thereof as shown in FIG. 28, for the eyes of an observer. FIG. 28 shows the state of the straight line in the horizontal direction of the test chart shown in FIG. 27 before and after it is corrected. The center of the image is taken as an original point, and the x-axis and the y-axis are set in the horizontal and vertical directions of the test chart. A distortion $\Delta y$ in the vertical direction occurs at a position P(x, y) on the display image. Thus, the $\Delta y$ is determined. The table in the EEPROM 114 is corrected based on the distortion $\Delta y$ so that the image of the image P(x, y) can be displayed on the corrected position Q. If the above-described detection of the distortion $\Delta y$ at a position P(x, y) is carried out for all of the pixels constituting the image, it will take much time to perform it. Therefore, the following method may be made. That is, several portions within the image are set as typical points, a distortion $\Delta y$ at each typical point is calculated, and for the other points, the distortion $\Delta y$ is estimated by interpolation or the like. Thus, the distortions $\Delta y$ for all of the pixels are determined. Then, the table in the EEPROM 114 is modified so that the distortions $\Delta y$ can be corrected.

Also, such modification can be manually performed by checkers. However, this is not practical considering the production efficiency, the cost, and the individual difference of checkers, and so forth. Thus, desirably, the inspection correction system in which automatic measurement is carried out, and the table is automatically modified is employed, as described above. In the case in which an observer carries out the modification when uses the information display apparatus 1, the observer may manually perform the modification while he/she observes the image of the test chart 155 via the second HOE 107.

In the above-description, the distortion $\Delta y$ in the vertical direction is an object of the correction as shown in FIG. 28. However, the object of the correction is not limited to the above-described distortion. The object of the correction may be different types of geometrical distortions such as ones in the horizontal direction, the rotation direction, or the like.

Hereinafter, the information of an original image in the memory 116 is referred to as input information, the table information in the EEPROM 114 as intermediate information, and the image observed as a virtual image as output information. The above-described method of modifying the table stored in the EEPROM 114 shows that the intermediate information can be experimentally obtained based on the relationship between the input information and the output information. The characteristics of the intermediate information are determined by the optical system. The above-described method of experimentally determining the intermediate information does not depend on the particular optical system. Accordingly, even if another optical system is employed, the intermediate information can be determined. Thus, the above-described method is not limited to the optical system described in this embodiment, and can be applied to various types, of optical systems, provided that the optical systems are in conformity with the technical idea that the peripheral image is magnified.

Figure 29:
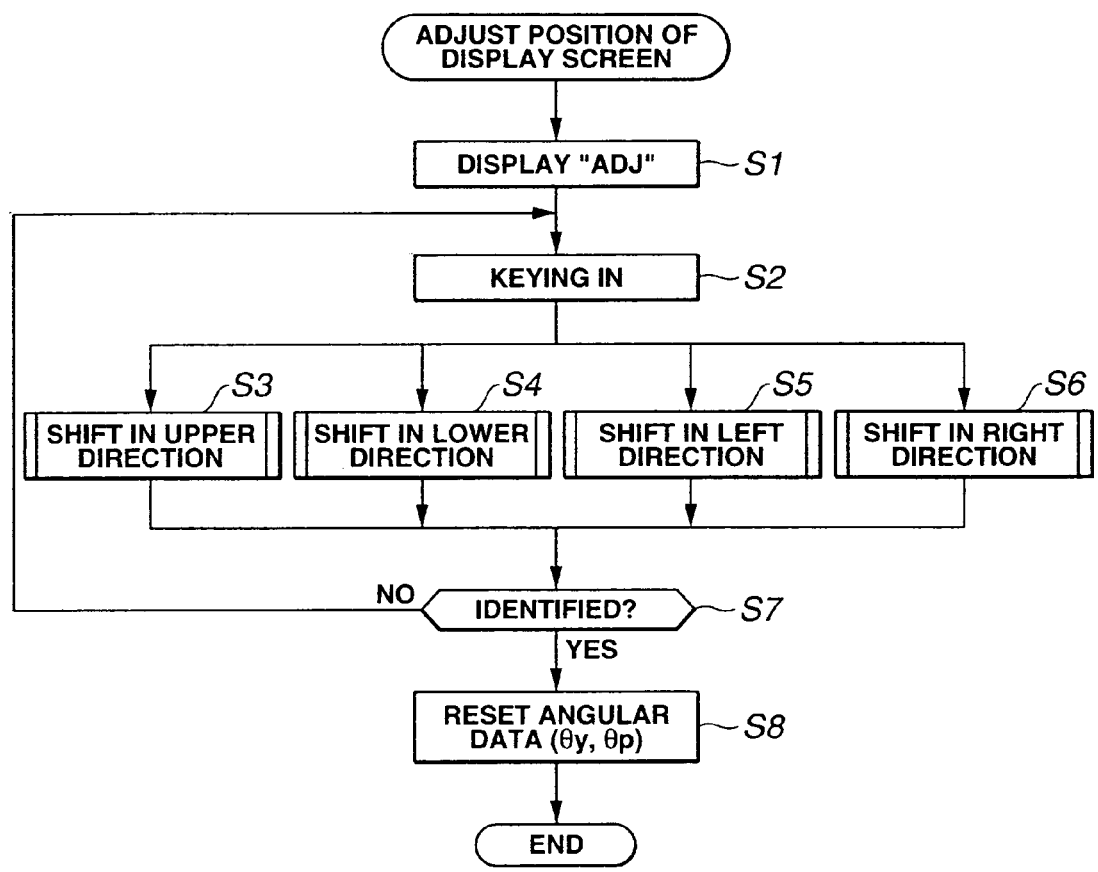
FIG. 29 is a flowchart illustrating processing for adjusting the initial position of a display screen in the same embodiment.
Figure 32:
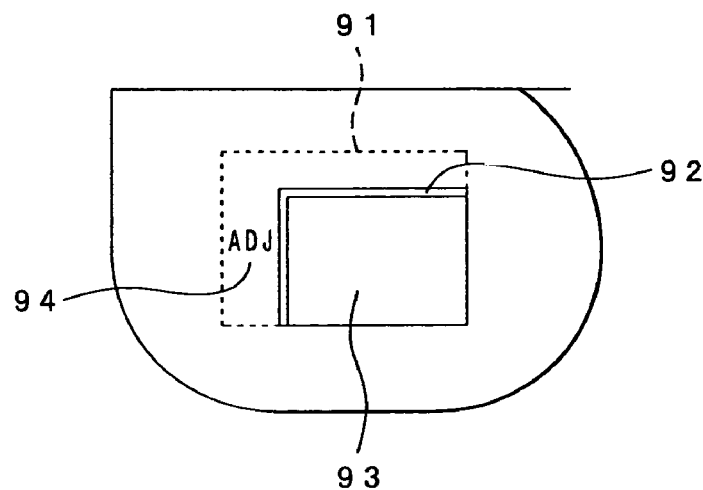
FIG. 32 shows an example of a screen displayed when the initial position of the display screen is adjusted in the same embodiment.
Figure 33:
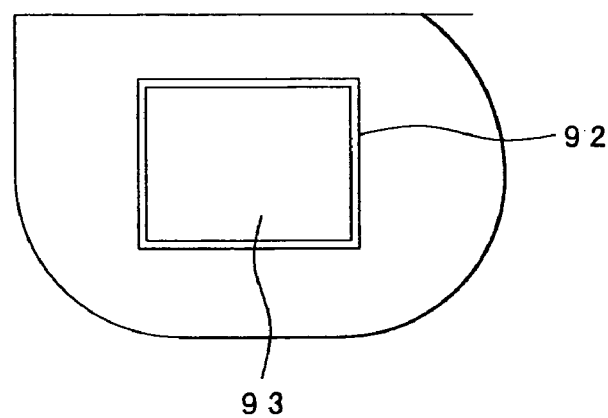
FIG. 33 shows an example of a screen displayed when the initial position of the display screen has been adjusted in the same embodiment.
Figure 34:
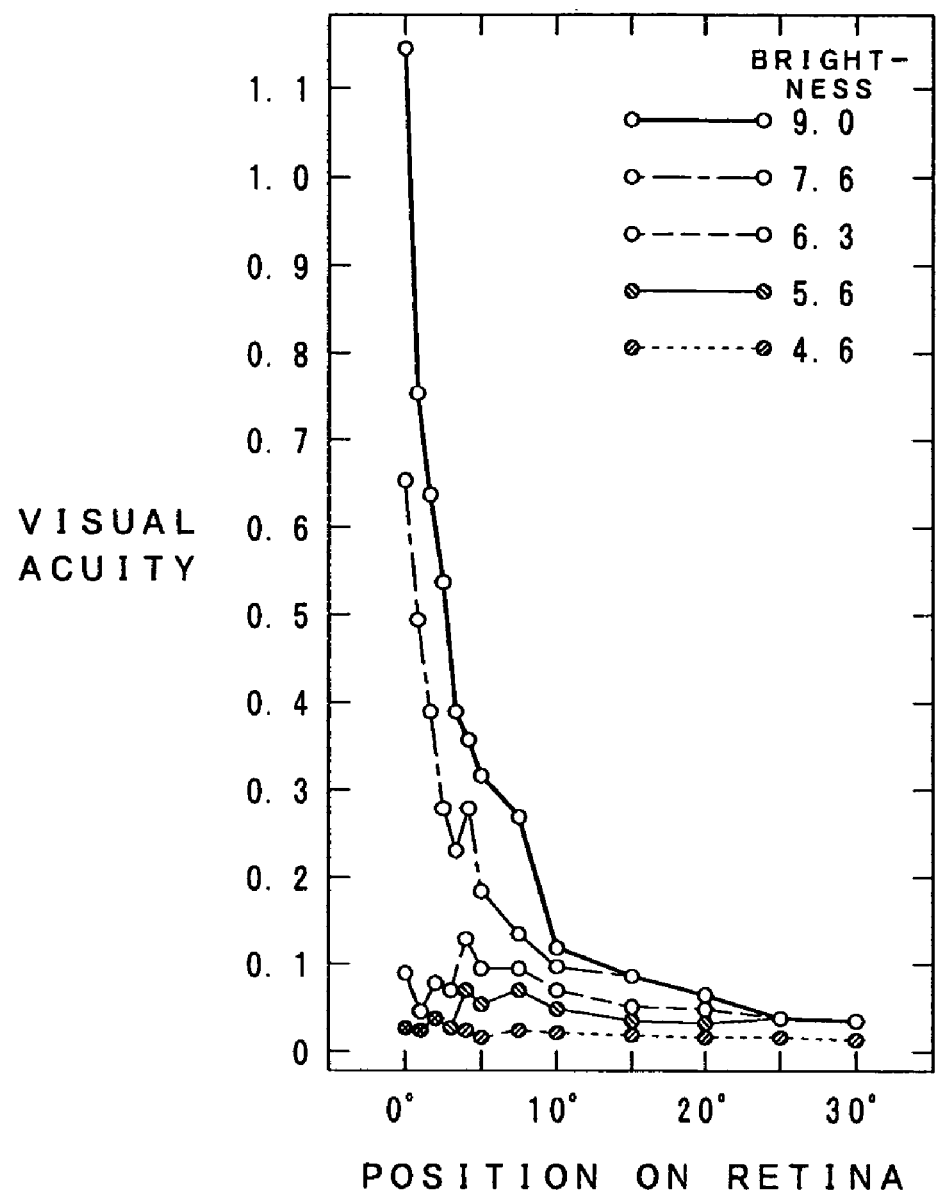
FIG. 34 is a diagram illustrating the visual acuity in different portions of a retina which varies with the brightness as a parameter in the related art.

FIG. 29 is a flow chart illustrating the processing of adjusting the initial position of a display screen. The processing illustrated in FIG. 29 is described with reference to FIGS. 32 and 33. FIG. 32 illustrates a display example of a screen when the initial position of the display screen is adjusted. FIG. 33 illustrates a display example of the screen of which the initial position has been adjusted.

The information display apparatus 1 of this embodiment can display a display-image as if the image were stationary with respect to the external environment, irrespective of the movement of an observer's head. Accordingly, when the observer tilts his/her head, the image can be shifted in the direction opposite to the tilting, in an amount corresponding to the tilting-degree. The processing illustrated in FIG. 29 is the one for determining the tilting angle of the head at which the above-described shifting is carried out.

For example, it is assumed that when the observer faces just forward, such a screen as shown in FIG. 32 is displayed. In FIG. 32, a range 91 capable of being displayed is shown by a dotted line. A display frame 92 is displayed within the right and lower part of the display-capable range 91. The inside of the display frame 92 is a display screen 93.

In this state, the observer carries out predetermined keying-in operation to set the information display apparatus 1 into the adjustment mode, using the remote controller 5. Then, a character 94 "ADJ", representing the adjustment mode, is displayed in the left part of the display-capable range 91 (step S1).

Subsequently, the pointer 74 of the remote controller 5 is moved in the upper, lower, right, or left direction by keying-in, and then, the first CPU 111 of the controller/recorder 4 wirelessly detects the keying-in (step 2).

Then, when keying-in for moving the pointer 74 in the upper direction is detected, the display frame 92 and the display screen 93 are moved at a predetermined movement velocity in the upper direction within the display-capable range 91 while the keying-in operation is being carried out (step 3).

When keying-in for moving the pointer 74 in the lower direction is detected, the display frame 92 and the display screen 93 are moved at a predetermined movement velocity in the lower direction within the display-capable range 91 while the keying-in operation is being carried out (step 4).

When keying-in for moving the pointer 74 in the left direction is detected, the display frame 92 and the display screen 93 are moved at a predetermined movement velocity in the left direction within the display-capable range 91 while the keying-in operation is being carried out (step 5).

When keying-in for moving the pointer 74 in the right direction is detected, the display frame 92 and the display screen 93 are moved at a predetermined movement velocity in the right direction within the display-capable range 91 while the keying-in operation is being carried out (step 6).

After one of the operations at steps S3 to S6 is completed, the information display apparatus 1 waits for the left button 75 of the remote controller 5 being clicked (step S7). Here, the processing is returned to the step S2, and the keying-in is succeedingly carried out until the left button 75 is clicked.

When the left button 75 is clicked, the clicking causes the position of the display frame 92 to be defined. Simultaneously, the character 94 "ADJ" representing the adjustment mode disappears. Thereby, for example, the display frame 92 and the display screen 93 shown in FIG. 33 are displayed as virtual images.

Thereafter, the angular velocity data Oy and Op in the yaw and pitch directions of the head, which were calculated based on the outputs of the angular velocity sensors 81 and 84 are reset (step S8). Thus, the adjustment of the position of the display screen is completed.

By the above-described adjustment, the positions of the display frame 92 and the display screen 93 in the initial state are defined. Thereafter, the angular data $\theta_Y$ and $\theta_P$ are measured using the initial state as a base point.

In the examples of FIGS. 32 and 33, the display frame 92 is shown by a boundary line. However, the display frame 92 is not necessarily shown.

In the above case, the adjustment of the initial position is performed by the processing illustrated in FIG. 29. This is not restrictive. For example, when the head has a predetermined tilting angle (specifically, when the head of an observer tilts at a predetermined angle to be set as an initial position), a predetermined keying-in operation (for example, the operation is clicking the left button 75) may be executed. Thereby, the display screen is set at a predetermined position, and the angular data $\theta_Y$ and $\theta_P$ are reset. If the above-described operation system is employed, the initial positions of the display frame 92 and the display screen 93 can be adjusted more easily.

Figure 30:
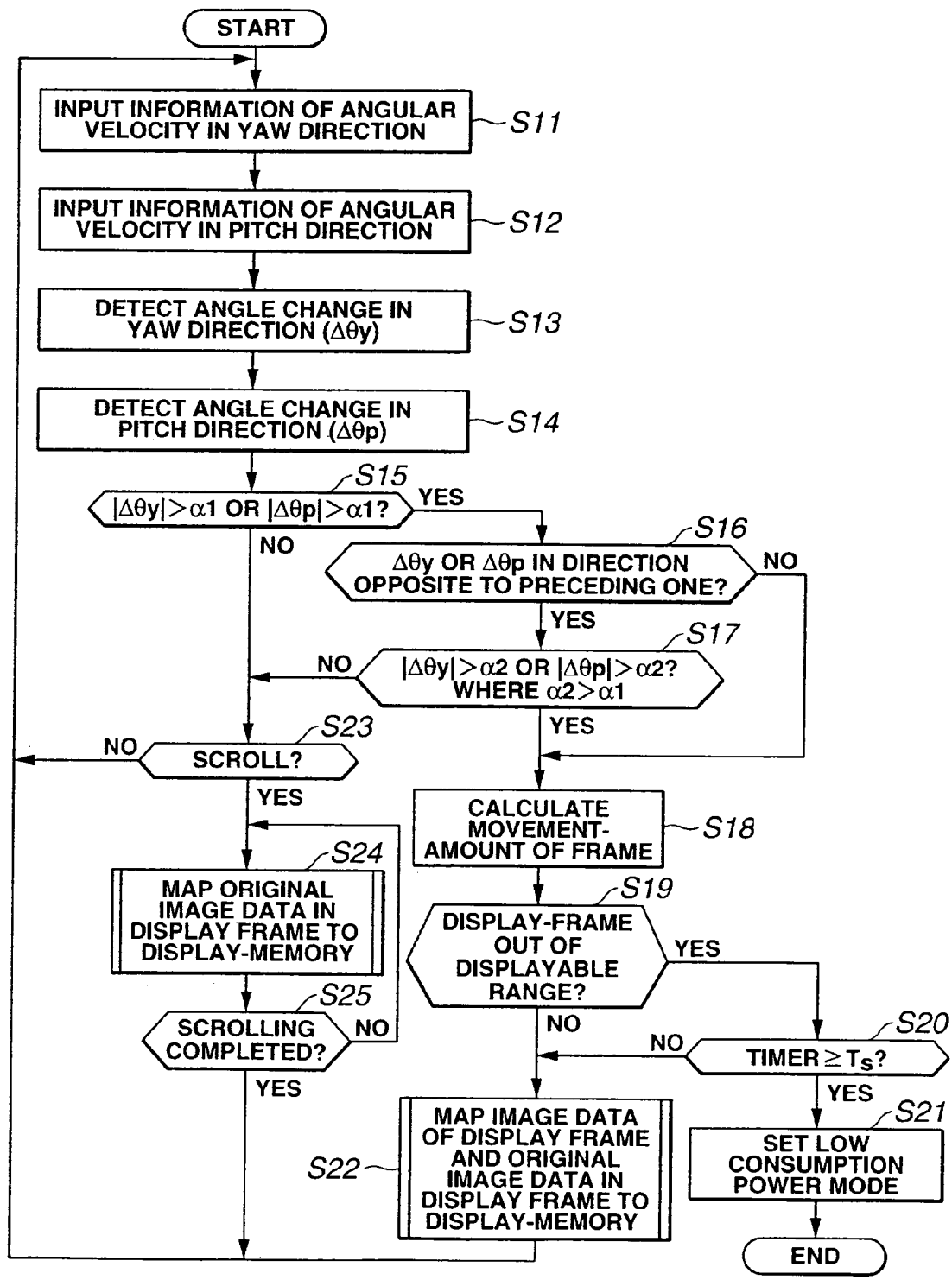
FIG. 30 is a flowchart illustrating processing for controlling the display position of an image in the same embodiment.

FIG. 30 is a flow chart illustrating the processing for controlling the display position of an image.

According to the processing illustrated in FIG. 30, a display area is shifted in the direction opposite to that of the tilting angle of the head, so that the observer can observe a monitor as if it were stationary with respect to the external environment.

There are no problems in the case in which, when the display area of the monitor is shifted corresponding to the tilting angle of the head, the display area can be changed smoothly at a high speed corresponding to the change of the tilting angle of the head. However, in practice, the speed of the change of the display area has a limitation. Thus, the display area can not be smoothly updated. Therefore, according to this embodiment, the display can be updated only when the angle changes to a predetermined degree or more so that the smoothness is not significantly deteriorated.

If the display area is updated with some lag every time the tilting angle of the head finely changes, particularly, if the display area is frequently updated, the observer feels that the movement is wrong. Accordingly, in this embodiment, the threshold of the head-tilting angle change when the head tilting angle changes in the forward direction is made different from that when the head tilting angle changed in the backward direction. That is, in comparison with the angular change in the forward direction at which the display area is updated, the angular change immediately after the angular change in the backward is detected is set to be larger. That is, a so-called hysteresis characteristic is provided, so that the above-described feeling of the wrongness is reduced (see steps S15 to S19 and step S22 which are described below). Moreover, in this embodiment, when scrolling-operation is carried out, the display area is updated in such a manner that the image in the display area is scrolled (see steps S23 to 25 which will be described below).

The above-described processing will be described in detail with reference with FIG. 30.

The processing is started. First, the angular velocity information in the yaw direction of the observer's head detected by the angular velocity sensor 81 is input (step S11), and also, the angular velocity information in the pitch direction of the observer's head detected by the angular velocity sensor 84 is input (step S12).

The angular velocity in the yaw direction, acquired at the step 11, is integrated with respect to the time. Thus, the angular change $\theta_Y$ [rad] in the yaw direction is calculated (step S13). Also, the angular velocity in the yaw direction, acquired at the step 12, is integrated with respect to the time. Thus, the angular change $\theta_p$ [rad] in the pitch direction is calculated (step S14).

Subsequently, it is determined whether at least one of the absolute value $|\Delta\theta_Y|$ of the angular change in the yaw direction within a predetermined time and the absolute value $|\Delta\theta_p|$ of the angular change in the pitch direction within the predetermined time is larger than a predetermined value $\alpha 1$ (predetermined first threshold) or not. That is, it is determined whether at least one of $|\Delta\theta_Y|>\alpha 1$ and $|\Delta\theta_p|>\alpha 1$ is effective or not (step S15).

In the case in which it is determined that at least one of $|\Delta\theta_Y|$ and $|\Delta\theta_p|$ is larger than the predetermined value $\alpha 1$, it is determined whether $|\Delta\theta_Y|$ or $|\Delta\theta_p|$ determined to be larger than the predetermined value $\alpha 1$ has a value representing the opposite direction with respect to the preceding detected value (that is, the sign of the value is opposite to that of the preceding value or not) (step S16). This processing determines whether the change of the tilting angle of the head is still in the forward direction, or the direction of the tilting angle change has turned to be opposite.

In the case in which it is determined that the value represents the opposite direction at the step S16, it is determined whether at least one of the absolute value $|\Delta\theta_Y|$ of the angular change in the yaw direction and the absolute value $|\Delta\theta_p|$ of the angular velocity in the pitch direction is larger than a predetermined value $\alpha 2$ (predetermined second threshold) (the second predetermined value $\alpha 2$ satisfies $\alpha 2>\alpha 1$) or not. That is, it is determined whether at least one of $|\Delta\theta_Y|>\alpha 2$ and $|\Delta\theta_p|>\alpha 2$ is effective or not (step S17).

In the case in which at least one of $|\Delta\theta_Y|$ and $|\Delta\theta_p|$ is determined to be larger than the second predetermined value $\alpha 2$ at the step S17, or in the case in which the sign of the value does not represent the opposite direction at the step 16, the movement amount of the display frame 92 (and the display screen 93) corresponding to the $\Delta\theta_Y$ or the $\Delta\theta_P$ is calculated (step S18). The calculation of the movement amount is calculated according to $L\times\Delta\theta_Y$ or $L\times\Delta\theta_P$, in which L represents the distance between the eye of an observer and the screen.

Subsequently, it is determined whether at least a part of the display frame 92 after the movement is within the display-capable range 91 or the whole of the display frame 92 gets to be out of the display-capable range 91, based on the calculated movement (step S19).

In the case in which the whole of the display frame 92 is determined to get to be out of the display-capable range 91, it is determined whether the time-period from the time when the whole of the display frame 92 first moves out of the display-capable range 91, measured with a timer disposed on the inner side of the first CPU 111 is not less than a predetermined time-period Ts stored in the EEPROM 114 or not (step S20).

In the case in which the time-period is more than the predetermined time-period Ts, the information display apparatus 1 is set in a low consumption power mode, so that the power supplied from the power supply circuit 124 is reduced (step S21). Then, this processing is completed. The predetermined time-period Ts can be set at a desired time-period by operation of the menu button 63, the menu selection switches 66, 67, 68, and 69, and the defining switch 65 shown in FIG. 8, as described above. Specifically, the low consumption power mode is executed by stopping the operation of the first CPU 111 and the second CPU 112, excluding the operation with respect to a part of the functions thereof and by stopping the operation of the blocks excluding the CPUs. This means is known. In the low consumption power mode, the image of the display frame 92 is not displayed, and only an image on the outside can be observed. The information display apparatus 1 can be set in the low consumption power mode at the step 21. Instead of this, the power supply of the information display apparatus 1 may be turned off.

In the case in which it is determined that at least a part of the display frame 92 is within the display-capable range 91, and an image can be displayed at the step S19, or in the case in which the time-period while the display frame 92 is in the "non-display" state is shorter than the predetermined time-period Ts at the step S20, the information of the display frame 92 and that of the display screen 93 are mapped to the display memory 125 and stored therein in such a manner that the display screen is moved in an amount corresponding to the movement amount calculated at the step S18, in the direction opposite to that of the angular change in the yaw direction or the pitch direction of the observer's head (step S22). Thereafter, the processing is returned to the step S11, and the above-described processing is repeated.

In the case in which both of $|\Delta\theta_y|$ and $|\Delta\theta_p|$ are determined to be not more than the α1 at the step S15, or both of the $|\Delta\theta_y|$ and $|\Delta\theta_p|$ are determined to be not more than α2 at the step S17, it is determined whether the display screen 93 within the display frame 92 is scroll-operated or not (step S23). The scroll-operation is executed by keying-operating the pointer 74 of the remote controller 5 so that it moves in the upper, lower, right or left direction. While one of the keying-operations is carried out, the display screen 93 is scrolled in a specified direction corresponding to the keying-operation.

In the case in which it is detected that the scroll-operation is carried out at the step S23, the original image is read from the memory 116, mapped to, and stored in the corresponding positions of the memory cells within the display frame 92 in the display memory 125, so that the display screen 93 is scrolled corresponding to the scroll-operation (step S24).

Thereafter, it is determined whether the scroll-operation is completed or not (step S25). The processing is returned to the step S24, and the above-described processing is repeated until the scroll-operation is completed.

In the case in which it is determined that the scroll-operation is completed, or in the case in which it is determined that the scroll-operation is not carried out at the step S23, the processing is returned to the step S11, and the above-described processing is repeated.

Figure 31:
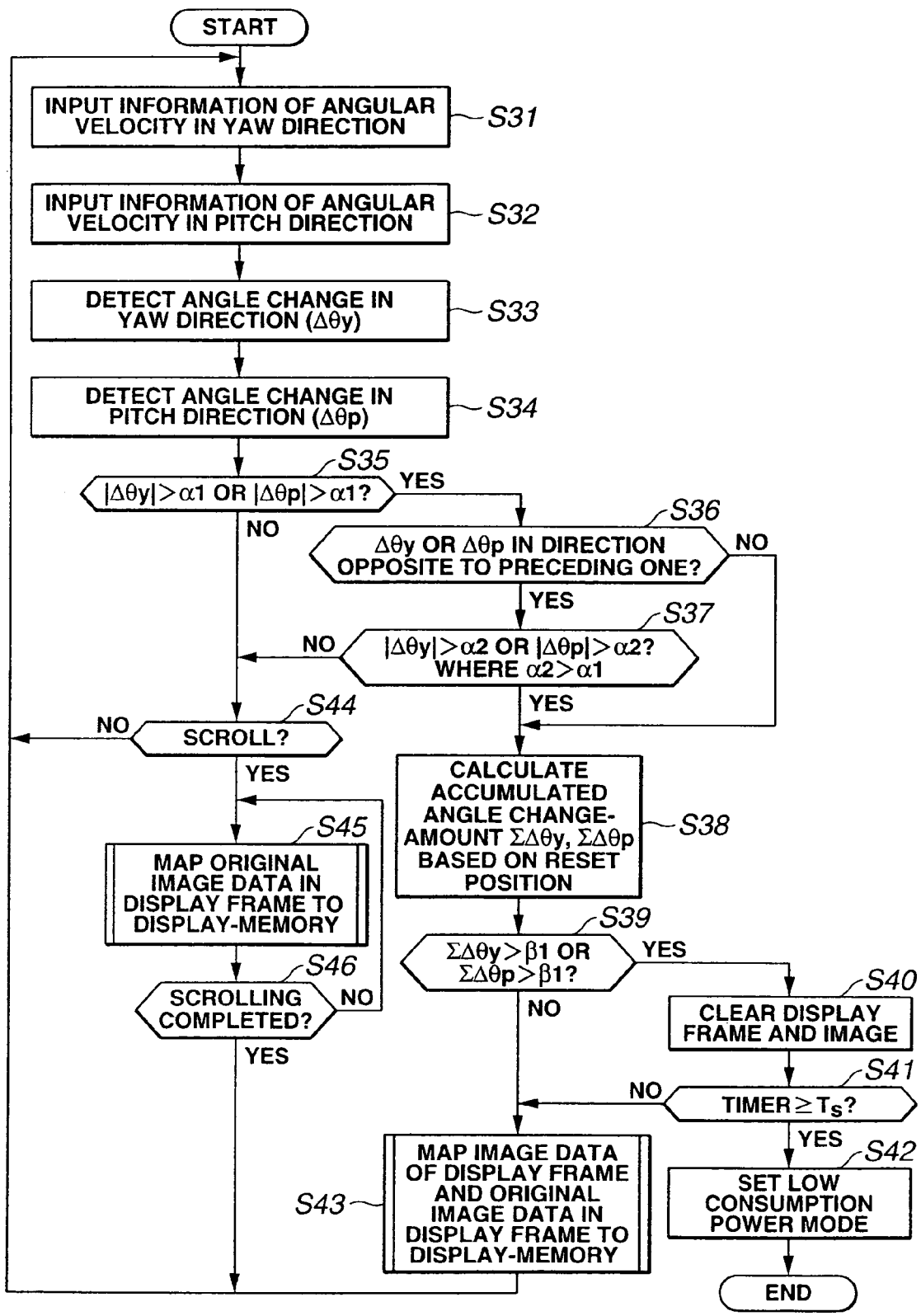
FIG. 31 is a flowchart illustrating an example of processing for controlling the display or non-display of an image in the same embodiment.

In the example described with reference to the flow chart of FIG. 30, the position of the display frame 92 is updated, following up the change in tilting of the head, and thereby, the display frame 92 is displayed as if it were stationary with respect to the external environment. This display gives a natural feeling. That is, the display frame 92 seems to be as if it were a part of the external environment. Thus, advantageously, the fatigue of the eyes of an observer can be reduced. However, according to the processing illustrated in FIG. 30, the display is sequentially updated, following up the tilting of the head. Thus, the display must be carried out at a high speed. Thus, the power consumption increases. FIG. 31 illustrates an example of the processing that takes account of the above-described problems. According to the processing illustrated in FIG. 31, the display frame 92 is displayed at a constant position without the position of the display frame 92 being updated, when the tilting angle of the head is less than a predetermined value. The display is caused to disappear, when the tilting angle of the head is not less than the predetermined value. According to this manner, advantageously, the configuration is simple, and the consumption power is small, compared with the processing described with reference to FIG. 30, although the display gives somewhat an artificial feeling.

FIG. 31 is a flow chart of an example of the processing for controlling the display/non-display of an image.

For a part of the processing illustrated in FIG. 31 which is similar to the processing illustrated in FIG. 30, the description is obviated, if it is appropriate. Thus, the description is made only for the part thereof different from the processing of FIG. 30.

The processings at steps S31 to 37 illustrated in FIG. 31 are similar to those illustrated in FIG. 30.

In the case in which at least one of $|\Delta\theta_y|$ and $|\Delta\theta_p|$ is determined to be larger than the second predetermined value α2 at the step S37, or in the case in which it is determined that the sign of the value does not represent the opposite direction at the step S36, an accumulated angle change-amount $\Sigma\Delta\theta_Y$ is calculated based on the reset position of the $\Delta\theta_Y$, or an accumulated angle change-amount $\Sigma\Delta\theta_P$ is calculated based on the reset position of the $\Delta\theta_P$ (step S38). The calculation of the movement amount is made according to $L\times\Sigma\Delta\theta_Y$ or $L\times\Sigma\Delta\theta_P$ in which L represents the distance between the eye of an observer and the screen.

Subsequently, it is determined whether at least one of the calculated $\Sigma\Delta\theta_Y$ and $\Sigma\Delta\theta_P$ is larger than a predetermined angle β1 (step S39).

In the case in which at least one of the accumulated angle change-amounts is determined to be larger than the predetermined angle β1, the display of the display frame 92 and also an image within the display frame 92 are caused to disappear (step S40). The predetermined angle β1 is set at a value at which it can be determined that the display frame 92 gets to be out of the display area in the case in which the display frame 92 is displayed as if it were stationary with respect to the external environment, as described in the example of FIG. 30. It is needless to say that the display/non-display may be exchanged within an angular change-range in which no artificial visual feeling is given.

After the display frame 92 and the image are caused to disappear according to the processing at the step S40, it is determined whether the time-period from the time when the display frame 92 and the image are caused to disappear, measured by a timer disposed in the first CPU 111, is not less than a predetermined time-period Ts, or not (step S41).

In the case in which the time-period is determined to be more than the predetermined time-period Ts at the step S41, the information display apparatus 1 is set in the low consumption power mode, so that the power supplied from the power supply circuit 124 is reduced (step S42). Thereafter, this processing is completed. In the low consumption power mode, images such as the display frame 92 and so forth are not displayed, and only external image can be observed. As described above, the information display apparatus 1 is changed into the low consumption power mode at the step S42. Instead of this, the power supply of the information display apparatus 1 may be turned off.

In the case in which both of the calculated angle change-amounts $\Sigma\Delta\theta_Y$ and $\Sigma\Delta\theta_P$ are determined to be less than the predetermined angle β1, or in the case in which it is determined at the step S41 that the time-period when the display frame 92 and an image are in the "non-display" is less than the predetermined time-period Ts, the information of the display frame 92 and that of the display screen 93 are mapped to the display memory 125, and the display of the display frame 92 and an image within the display frame 92 at a reset position are started (step S43). Thereafter, the processing is returned to the step S31, and the above-described processing is repeated.

The processing at steps S44 to S46 illustrated in FIG. 31 are similar to the steps S23 to S25 illustrated in FIG. 30.

The processing described with reference to FIGS. 30 and 31 is carried out mainly by the first CPU 111 (see FIG. 11). The processing executed by the first CPU 111 may be distributed so that the second CPU 112 carries out a part of the processing, considering the load to the first CPU 111.

As described above, the date to be displayed on the LCD 104 is prepared based on the original image stored in the memory 116. Character data prepared by the character generator 126 and other form data may be written directly in the display memory 125, not via the memory 116. In this case, the data is written in the display memory 125 after the data is processed corresponding to the display position, looking up the table in the EEPROM 114, similarly to the case of the original image stored in the memory 116.

On the contrary, it is possible that the data of the original image read from the memory 116 is real-time processed and output from the second CPU 112 synchronously with the display-control made by the LCD driver 105 without the data of the original image being written in the display memory 125.

With the above-described information display apparatus, the display image of which the resolution is decreased more and more toward the periphery thereof is projected to the eye of an observer while the geometrical similarity to the original image can be kept substantially constant as an example. However, this method is not restrictive. The technique in which the resolution is reduced toward the periphery may be applied to projector devices or the like, by which an image is projected to a screen or the like.

According to this embodiment, the resolution of an image part corresponding to the center of a retina in which the visual acuity is set to be high, while that of an image part corresponding to the periphery of the retina in which the visual acuity is set to be low, considering the characteristics of human's eyes. Therefore, an image can be observed as if the resolution of the whole image were high. In this case, the number of pixels provided for the display element, which has a limitation, are effectively used. Thereby, an display element in which the number of pixels is smaller, and the cost is relatively low can be used to obtain such a high-resolution feeling as is comparable to that of a conventional display image. If a display element comparable to a conventional one in the number of pixels and the size is used, a much higher resolution-feeling can be obtained.

In this case, the figure of the observed image is substantially similar to that of the original image. Thus, the periphery of the image is prevented from being compressed or decompressed, and thus, the feeding of the observed image is natural.

The reduction of the resolution in the peripheral portion of the image is performed by mapping the original image to the memory cells. Therefore, the processing can be performed at a high speed, and thus, the delay time till the image is displayed can be reduced as much as possible. In this case, the coordination relationship is stored as a table in the EEPROM, and thereby, the processing can be performed at a high speed while a much load is not applied to the CPU or the like.

One point on an image is set as a predetermined reference position. Thereby, the pixels of the display element can be efficiently used, and the resolution feeling can be enhanced.

Moreover, a straight line passing through one point on an image is set as a predetermined reference position, and thereby, the mapping processing can be performed simply and at a high speed.

The above-described configuration is particularly effective in a head-mounted information display apparatus which is mounted on the head of an observer and with which display information is projected to the eye of the observer.

In addition, the information display apparatus is so configured that the display information in the display area can be scrolled. Therefore, desired information can be displayed in the part of the display area to which a highest resolution is given. Thus, a desired image can be clearly observed, although the device has a small size and a light weight.

Furthermore, the image is moved in the direction opposite to the tilting direction of the head of an observer, so that the position of the virtual image observed by the observer is kept substantially constant, irrespective of the tilting of the head of the observer. Thus, the observer can observe an image as if the display screen (e.g., having a large size) were stationary with respect to the external environment.

Moreover, the initial position of the display image can be adjusted. Thus, the optimum initial position can be selected, depending on the individual difference and the use purpose of the observer. For example, in the case in which the information display apparatus is used as a monitor for a personal computer in a tramcar, it is possible to set the display screen in the lower, oblique direction and input characters from the remote controller. The tilting angle of the head can be detected using the initial position as a reference. Accordingly, an image taken from the position of the head of the observer taking a natural pose as a center can be observed. As the initial position of the display screen is adjusted as described above, the display screen seems as if it were set in the external environment at the optimum position thereof. Thus, the above-described adjustment function is convenient.

In the case in which the initial position of the image can be caused to be moved to a desired position, the degree of freedom for the adjustment is enhanced. In the case in which the initial position is adjusted to a predetermined position, the operation can be easily carried out.

In the case in which the tilting angle of the head is changed, and the angle change-amount during a predetermined time-period is not more than the first threshold, the display screen is not shifted in the direction opposite to the change-direction of the angle of the head. Thus, it is not necessary to calculate every time the tilting-angle of the head finely changes. Thus, the load to the CPU can be reduced.

Moreover, the threshold (second threshold) used to determine whether the display screen is shifted in the direction opposite to the change-direction of the angle of the head or not in the case in which the tilting angle of the head changes in the opposite direction is set to be larger than the threshold used in the case in which the tilting angle changes in the same direction. This is effective in preventing the display screen from flicking, which is caused by the fine-vibration of the head occurring around a center which is the predetermined position.

Moreover, a predetermined image is displayed so as to be superimposed on the image of the external environment, and the display state and the non-display state of the image are changed over corresponding to the tilting angle of the head. In the case in which the non-display state continues longer than a predetermined time-period, the non-display state is succeedingly kept even after the tilting angle of the head has a value corresponding to the display-state. Thus, by the simple operation, that is, by changing the angle of the head, observation of the image and that of the external environment required for ordinary action can be easily changed over while the information display apparatus is mounted to the head. For example, in the case in which the information display apparatus is used as a monitor for a personal computer in a tramcar or the like, and the display screen is set to position in the lower oblique part, the screen disappears from the visual field when the user gets off the tramcar and the head is raised. Thus, the external environment can be observed without being disturbed. Accordingly, ordinary action can be taken with safety without the information display apparatus being removed.

Moreover, when the non-display state continues for more than a predetermined time-period, the power supply is turned off, or the information display apparatus is set in the low consumption power mode. Thus, the consumption power can be reduced, and the service life of the battery can be saved, although the operation of changing over the mode or turning off the power supply is not intentionally carried out.

Thus, the information display apparatus, which is wearable and portable, can be conveniently used, and can provide high grade functions.

Moreover, the predetermined time-period until the information display apparatus 1 is switched to the low consumption power mode can be set at a desired value. Thus, the observer can use the information display apparatus corresponding to his/her need.

[Appended Portions]

According to the foregoing embodiment of the present invention, the following configurations can be implemented.

[Appended Portion A1]

An information display apparatus comprising:

display means for displaying an original image, which is a display object, as display information in such a manner that the resolution with respect to the original image is lowered as its position goes away from a predetermined reference position; and an optical system for guiding the display information in such a manner that the display information can be observed substantially in a figure geometically similar to the original information excepting the reduction of the resolution.

[Appended Portion A2]

An information display apparatus according to Appended Portion A1, wherein the apparatus comprises:

first storage means for storing the original image;

a display element having a plurality of pixels arranged at equal intervals in the two-dimensional direction; and display-control means for reading the original image from the first storage means, controlling the assignment of the original information to the pixels of the display element so that the resolution is lowered as its position goes away from the reference position, and causing the display element to display the image, wherein the optical system guides the display information in such a manner that the display information is more magnified as its position goes away from the reference position while the geometrical similarity to the original image can be substantially kept.

[Appended Portion A3]

An information display apparatus according to Appended Portion A2, wherein the display means further comprises second storage means having memory cells one-to-one coordinating to the pixels of the display element; and the display-control means controls the assignment of the original information to the pixels of the display element by mapping the original information read from the first storage means to the memory cells of the second storage means.

[Appended Portion A4]

An information display apparatus according to Appended Portion A3, wherein the display-control means comprises third storage means for storing, as a table, the mapping-coordination relationship between the original information stored in the first storage means and the memory cells of the second storage means.

[Appended Portion A5]

An information display apparatus according to Appended Portion A1, wherein the predetermined reference position is one point within the original image.

[Appended Portion A6]

An information display apparatus according to Appended Portion A1, wherein the predetermined reference position is a straight line passing through one point within the original image.

[Appended Portion A7]

An information display apparatus according to Appended Portion A1, wherein the optical system guides the display information by projecting the display information to the eye of an observer so that the display information can be observed.

[Appended Portion A8]

An information display apparatus according to Appended Portion A7, wherein the information display apparatus is such that it can be mounted on an observer's head for use.

[Appended Portion A9]

An information display apparatus according to Appended Portion A1, further comprising scroll means for scrolling the display information.

[Appended Portion B1]

A head-mounted display apparatus comprising:

display means for projecting an image to an observer's eye to observably display the image as a virtual image;

angle detection means for detecting the tilting angle of an observer's head;

movement-control means for controlling so that the image to be displayed by the display means is moved in an amount corresponding to the angle detected by the angle detection means in the direction opposite to the tilting direction of the observer's head, whereby the position of the virtual image observed by the observer is kept substantially constant, irrespective of the tilting of the observer's head; and adjustment means for adjusting the initial position of the image displayed by the display means;

whereby the movement-control means detects the tilting angle of the head, and controls the display position of the image displayed by the display means, based on the tilting angle of the head detected by the angle detection means, using the initial position of the image as a reference.

[Appended Portion B2]

A head-mounted display apparatus according to Appended Portion B1, wherein the adjustment means causes the movement-control means to move the image to a desired position for adjustment of the initial position of the image.

[Appended Portion B3]

A head-mounted display apparatus according to Appended Portion B1, wherein the adjustment means adjusts the initial position of the image to a predetermined initial position in advance.

[Appended Portion C1]

A head-mounted display apparatus comprising:

display means for projecting an image to an observer's eye to observably display the image as a virtual image;

angle detection means for detecting the tilting angle of an observer's head;

movement-control means for calculating the angle-change amount per a predetermined time-period, based on the angle detected by the angle detection means, and when the angle change-amount is not less than a predetermined threshold, controlling so that the image to be displayed by the display means in such a manner that the image is moved in an amount corresponding to the angle detected by the angle detection means in the direction opposite to the tilting direction of the observer's head, whereby the position of the virtual image observed by the observer is kept substantially constant, irrespective of the tilting of the observer's head.

[Appended Portion C2]

A head-mounted display apparatus according to Appended Portion C1, wherein the movement-control means controls so that the predetermined threshold becomes larger in the case in which the angle-change-direction of the head for a predetermined time-period is opposite to the angle-change-direction of the head for the predetermined time-period immediately before the above-described predetermined time-period, compared with the case in which the angle-change-directions are the same.

[Appended Portion D1]

A head-mounted display apparatus comprising;

display means for setting a display frame defining a display area in which an image is displayed, in an image display-capable range, and displaying the image within the display frame;

angle detection means for detecting the tilting angle of an observer's head;

movement-control means controlling so that the display frame is moved in such a manner that the frame is moved in an amount corresponding to the angle detected by the angle detection means in the direction opposite to the tilting direction of the observer's head, whereby the position of the virtual image observed by the observer is kept substantially constant, irrespective of the tilting of the observer's head; and control means for controlling the head-mounted display apparatus to be automatically changed into a low consumption power mode in the case in which the display frame departs from the display-capable range, and is not displayed for not less than a predetermined time-period.

[Appended Portion D2]

A head-mounted display apparatus according to Appended Portion D1, further comprising time-set means for setting the predetermined time-period at a desired value.

[Appended Portion D3]

A head-mounted display apparatus according to Appended Portion D1, wherein the display means displays the image in such a manner that the image is superimposed on an image of the external environment.

[Appended Portion E1]

A head-mounted display apparatus comprising:

angle detection means for detecting the tilting angle of the head of an observer;

display means for displaying a predetermined image in such a manner that the image is superimposed on an image of the external environment, the display means being changed from the display-state of the image to the non-display-state thereof and vice-versa, corresponding to the tilting angle of the observer's head detected by the angle detection means; and control means for controlling the display means in such a manner that, in the case in which the non-display state of the display means continues for not less than a predetermined time-period, the non-display state is continuously kept, even if the tilting angle of the head, thereafter, gets to have a value corresponding to the display-state.

[Appended Portion E2]

A head-mounted display apparatus according to Appended Portion E1, wherein the display means is changed so as to be in the display state of the image when the tilting angle of the observer's head detected by the angle detection means is within a predetermined angle range and so as to be in the non-display state when the tilting angle departs from the predetermined range.

[Appended Portion E3]

A head-mounted display apparatus according to Appended Portion E1, wherein the display means displays the image in such a manner that the image is moved in an amount corresponding to the angle detected by the angle detection means in the direction opposite to the tilting direction of the observer's head, whereby the relative position of the image with respect to the external environment of the image, observed by the observer, is kept substantially constant, irrespective of the tilting of the observer's head.

[Appended Portion E4]

A head-mounted display apparatus according to any one of Appended Portions E1 to E3, wherein the control means controls the head-mounted display apparatus so that the power supply of the head-mounted display apparatus is turned off or so that the head-mounted display apparatus is set in a low consumption power mode, when the non-display state of the display means continues for not less than the predetermined time-period.

[Appended Portion E5]

A head-mounted display apparatus according to any one of Appended Portions E1 to E4, further comprising time-set means for setting the predetermined time-period at a desired value.

Having described the preferred embodiment of the invention referring to the accompanying drawings, it should be understood that the present invention is not limited to the precise embodiment and various changes and modifications thereof could be made by one skilled in the art without departing from the spirit or scope of the invention as defined in the appended claims.

What is claimed is:

1. A head-mounted display apparatus comprising:
   an angle detector to detect the tilting angle of the head of an observer;
   a display portion to display a predetermined image in such a manner that the predetermined image is superimposed on an image of an external environment, the display portion being changed from a display-state of the predetermined image to a non-display-state thereof and vice-versa, corresponding to the tilting angle of the observer's head detected by the angle detector; and
   a controller to control the display portion in such a manner that, in the case in which the non-display state of the display portion continues for not less than a predetermined time-period, the non-display state is continuously kept, even if the tilting angle of the head, thereafter, gets to have a value corresponding to the display-state thereafter.

2. The head-mounted display apparatus according to claim 1, wherein the display portion is changed so as to be in the display-state when the tilting angle of the observer's head detected by the angle detector is within a predetermined angle range and so as to be in the non-display state when the tilting angle departs from the predetermined angle range.

3. The head-mounted display apparatus according to claim 1, wherein the display portion displays the image in such a manner that the image is moved in an amount corresponding to the angle detected by the angle detector in the direction opposite to the tilting direction of the observer's head, whereby the relative position of the predetermined image with respect to the image of the external environment, observed by the observer, is kept substantially constant, irrespective of the tilting of the observer's head.

4. The head-mounted display apparatus according to claim 1, wherein the controller controls the head-mounted display apparatus so that the power supply of the head-mounted display apparatus is turned off, or so that the head-mounted display apparatus is set in a low consumption power mode, when the non-display state of the display portion continues for not less than the predetermined time-period.

5. The head-mounted display apparatus according to claim 2, wherein the controller controls the head-mounted display apparatus so that the power supply of the head-mounted display apparatus is turned off or so that the head-mounted display apparatus is set in a low consumption power mode, when the non-display state of the display portion continues for not less than the predetermined time-period.

6. The head-mounted display apparatus according to claim 3, wherein the controller controls the head-mounted display apparatus so that the power supply of the information display apparatus is turned off or so that the information display apparatus is set in a low consumption power mode, when the non-display state of the display portion continues for not less than the predetermined time-period.

7. The head-mounted display apparatus according to claim 1 further comprising time-set portion to set the predetermined time-period at a desired value.

8. The head-mounted display apparatus according to claim 2 further comprising time-set portion to set the predetermined time-period at a desired value.

9. The head-mounted display apparatus according to claim 3 further comprising time-set portion to set the predetermined time-period at a desired value.

10. The head-mounted display apparatus according to claim 4 further comprising time-set portion to set the predetermined time-period at a desired value.

11. The head-mounted display apparatus according to claim 5 further comprising time-set portion to set the predetermined time-period at a desired value.

12. The head-mounted display apparatus according to claim 6 further comprising time-set portion to set the predetermined time-period at a desired value.

* * * * *